United States Patent [19]

Merrill et al.

[11] Patent Number: 5,652,308
[45] Date of Patent: *Jul. 29, 1997

[54] TACKIFIERS AND A PROCESS TO OBTAIN TACKIFIERS

[75] Inventors: Natalie Ann Merrill, Deer Park; James McLeod Farley, League City, both of Tex.; Martha Hetzel Robertson, Jackson; Charles Lewis Sims, Baton Rouge, both of La.; Richard Byron Pannell, Kingwood; Angelo Anthony Montagna, Houston, both of Tex.

[73] Assignee: Exxon Chemical Patents Inc., Wilmington, Del.

[*] Notice: The term of this patent shall not extend beyond the expiration date of Pat. No. 5,552,489.

[21] Appl. No.: 505,421

[22] Filed: Jul. 21, 1995

Related U.S. Application Data

[63] Continuation-in-part of Ser. No. 378,302, Jan. 25, 1995, Pat. No. 5,552,489, which is a continuation of Ser. No. 278,768, Jul. 22, 1994, abandoned.

[51] Int. Cl.$^6$ .................. C08L 45/00; C08F 4/643; C08F 232/08
[52] U.S. Cl. ............ 525/211; 525/88; 525/97; 525/210; 525/216; 526/126; 526/127; 526/134; 526/160; 526/281; 526/282; 526/283; 526/308; 526/931; 526/935; 524/553; 524/554; 156/334
[58] Field of Search ................... 526/126, 127, 526/134, 160, 281, 282, 283, 308, 931, 935; 525/88, 97, 210, 211, 216; 524/553, 554; 156/334

[56] References Cited

U.S. PATENT DOCUMENTS

| | | |
|---|---|---|
| 3,467,637 | 9/1969 | Prucnal . |
| 3,470,145 | 9/1969 | Lipman . |
| 3,862,068 | 1/1975 | Russell . |
| 3,926,878 | 12/1975 | Shimizu et al. . |
| 3,966,690 | 6/1976 | Mathews et al. . |
| 4,010,130 | 3/1977 | Matsuo et al. . |
| 4,286,077 | 8/1981 | St. Clair et al. . |
| 4,288,567 | 9/1981 | Feeney et al. . |
| 5,003,019 | 3/1991 | Ishimaru et al. . |
| 5,008,356 | 4/1991 | Ishimaru et al. . |
| 5,059,487 | 10/1991 | Muro et al. . |
| 5,077,386 | 12/1991 | Teng et al. . |
| 5,087,677 | 2/1992 | Brekner et al. . |
| 5,191,052 | 3/1993 | Hlatky et al. . |
| 5,194,500 | 3/1993 | Chin et al. . |
| 5,324,801 | 6/1994 | Brekner . |
| 5,552,489 | 9/1996 | Merrill et al. .......... 526/160 X |

FOREIGN PATENT DOCUMENTS

| | | |
|---|---|---|
| 0283164 | 9/1988 | European Pat. Off. . |
| 0407870A2 | 1/1991 | European Pat. Off. . |
| 0501370A1 | 9/1992 | European Pat. Off. . |
| 0504418 | 9/1992 | European Pat. Off. . |
| 63-230707 | 9/1988 | Japan . |
| WO91/13106 | 9/1991 | WIPO . |

OTHER PUBLICATIONS

Seymour et al., Polymer Chemistry . . . (2d ed.) Marcel Dekker, Inc., N.Y., 93–97, 1988.

"Very Stable Narrow Molecular Weight Styrenic Block Copolymers" Jean M. Tancrede, Gary R. Marchand Adhesive Age, Jun. 1994, by Argus Inc., Atlanta, GA.

*Primary Examiner*—Fred Teskin
*Attorney, Agent, or Firm*—John E. Schneider; Frank E. Reid

[57] ABSTRACT

Novel tackifier resins having a $M_n$ of 5,000 or less and a $T_g$ of 0° C. or above are produced by combining a metallocene catalyst with an alpha-olefin and a cyclic monomer. New adhesives are produced by blending the novel tackifier with a base polymer.

30 Claims, No Drawings

TACKIFIERS AND A PROCESS TO OBTAIN TACKIFIERS

CROSS REFERENCE TO RELATED APPLICATIONS

This application is a continuation-in-part of allowed U.S. Ser. No. 08/378,302, filed Jan. 25, 1995, now U.S. Pat. No. 5,552,489, which is a continuation application of U.S. Ser. No. 08/278,768, filed Jul. 22, 1994, now abandoned.

FIELD OF THE INVENTION

This invention relates to improved tackifiers, methods to produce these tackifiers, and adhesive compositions made from these tackifiers.

BACKGROUND OF THE INVENTION

Tackifier resin is a term typically used to denote a low number average molecular weight polymer that, when blended with a higher molecular weight elastomer or base polymer, results in a blend that is particularly desirable in adhesive and sealant applications. The tack and adhesion properties of various base polymers can be significantly improved by combining the base polymer with a tackifier to produce a blend having a lower number average molecular weight and a higher glass transition temperature ($T_g$) than the unblended polymer. Tackifiers can be synthesized to contain only carbon and hydrogen, as in petroleum resins and polyterpenes, or can also contain oxygen such as coumarone-indenes or can be recovered from naturally occuring substances such as rosin esters.

Synthesized tackifiers are typically low molecular weight hydrocarbon resins. These resins have historically been produced by the polymerization of various feedstocks, typically olefin, diolefin, aliphatic, aromatic, or mixtures thereof. Typical polymerization systems include carbocationic and thermal polymerization.

Carbocationic polymerization typically uses a Friedel-Crafts catalyst to polymerize aliphatic and/or aromatic monomers, such as disclosed in U.S. Pat. No. 3,966,690. Typical aliphatic monomers are $C_5$ to $C_6$ paraffins, olefins, and diolefins. Typical aromatic monomers are alkylated benzenes or higher aromatics containing at least one vinylic unsaturation. Effective tackifiers are produced by these methods. However, because of the low catalyst activity levels combined with high catalyst to monomer ratios inherent to a Friedel-Crafts process, this process requires additional processing steps to purify the resin. These additional process steps result in aluminous waste water and chlorinated organic by-products which must be accounted for in the overall production costs. Furthermore, resins produced by these Friedel-Crafts methods typically result in Gardner color values of greater than 2. A lower color is desirable for many commercial applications. Thus, in order to reduce the color of the resins, further costly processing is required prior to use.

Thermal polymerization of tackifiers is typically a Diels-Alder reaction of cyclopentadiene and/or dicyclopentadiene derivatives, and optionally $C_4$–$C_5$ acyclic conjugated dienes and/or alkyl aromatic groups. Thermal polymerization takes place without a catalyst, therefore eliminating the costs associated with aluminous water and chlorinated by-products. However, tackifier resins produced by thermal polymerization have a high degree of unsaturation resulting in a Gardner color typically greater than 5. Therefore, to meet many commercial requirements, additional costly processing steps are required to reduce the color of the resins.

Until now useful tackifiers have not typically been produced using coordination catalysis. Tackifiers traditionally have a low number average molecular weight ($M_n$) for compatibility and a high glass transition temperature ($T_g$) for strength. Coordination catalysis, such as traditional Ziegler-Natta polymerization systems, do not easily produce polymers having both a low $M_n$ and a high $T_g$. Titanium-based catalyst systems using organoaluminum cocatalysts are known to copolymerize ethylene and cyclo-olefins. However, these processes suffer from inefficiencies in comonomer incorporation and the presence of side reactions, such as ring opening polymerization of the cyclo-olefin, resulting in copolymers having a broad molecular weight distribution. Known vanadium-based catalyst systems using organoaluminum cocatalysts offer improved comonomer incorporation relative to titanium, but because the polymerization activity is generally very low, these types of catalyst are not typically used commercially.

U.S. Pat. No. 5,003,019 discloses the use of a metallocene catalyst system using an alumoxane activator to produce copolymers of cyclo-olefins and alpha-olefins, but demonstrate only high $M_n$ thermoplastics. EP-A1-0 504 418 A1 discloses a metallocene coordination catalyst system to produce homopolymers and copolymers of cyclo-olefins with either very high or very low $T_g$'s, but demonstrate only homopolymers or high $M_n$ copolymers either of which have little value for typical tackifier applications.

Thus, the need exists for novel tackifiers having the desirable low $M_n$ and high $T_g$ combination while offering the further advantage of possessing good color without the need for additional costly processing steps.

SUMMARY OF THE INVENTION

This invention relates to improved tackifiers, methods to produce those tackifiers, and adhesive compositions made from those tackifiers. The preferred process to produce these improved tackifiers comprises contacting an α-olefin monomer and a cyclic monomer with a coordination catalyst system such as a cyclopentadienyl transition metal compound or derivatives thereof combined with an alumoxane or a non-coordinating anion activator. Particularly, the novel tackifiers of this invention are copolymers of an alpha-olefin and a cyclic olefin produced with a metallocene catalyst system. The new tackifiers can be used in any type of adhesive composition. The instant invention also relates to adhesive compositions comprising these new tackifiers.

DETAILED DESCRIPTION OF THE INVENTION

Tackifier Production Process

The low $M_n$, high $T_g$, low color tackifier resins of this invention are produced using a coordination-insertion catalyst system to copolymerize at least one alpha-olefin and at least one cyclic monomer.

Monomers

Preferred monomers that can be polymerized to produce tackifiers by this process include ethylene and $C_3$ to $C_{20}$ alpha-olefins, preferably a $C_3$ to $C_8$ alpha-olefins, more preferably propylene, and 1-butene.

Preferred comonomers are cyclic, preferably dicyclopentadiene, cyclopentadiene, norbornene, ethylidene norbornene, ethylene norbornene, vinyl norbornene, methylcyclopentadiene, and the like or substituted versions or derivatives thereof.

In general, any cycloolefin can be copolymerized with an olefin in the present process. In a preferred embodiment the "cyclic olefin" is a dimer or a trimer of the cyclic comonomer, wherein the dimer or trimer retains at least one polymerizable olefinic unsaturation. In another preferred embodiment, the cyclic olefin is a codimer of two different monomers. One type of preferred codimer contains cyclopentadiene and an alicyclic olefin or diolefin such as piperylene or isoprene. The cycloolefin includes cyclized ethylenic or acetylenic unsaturation which polymerizes in the presence of the metallocene catalyst substantially by insertion polymerization, without detectable ring opening as measured by fourier transform infrared spectroscopy (FTIR), nuclear magnetic resonance (NMR), or similar methods. Therefore, the ring structure in which the unsaturation is present is incorporated into the or appended to the polymer backbone intact.

In one embodiment, the cyclic olefins contain one polymerizable double bond as shown in formulae 1–3 below:

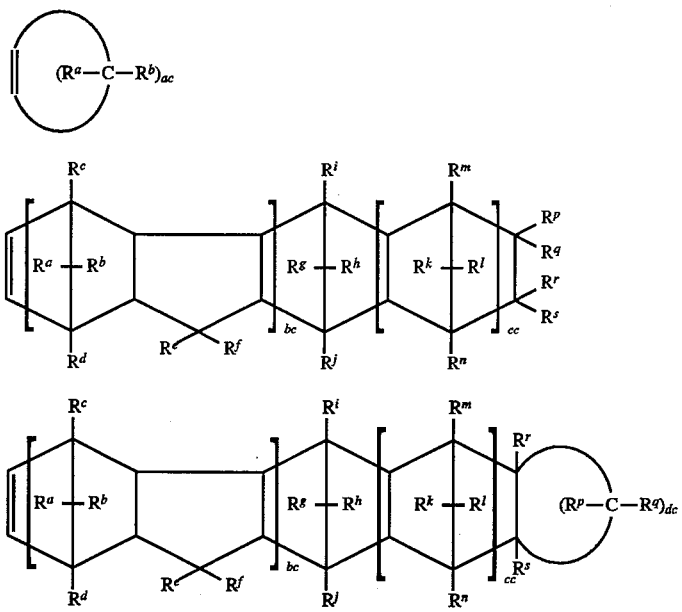

wherein each $R^a$ through $R^s$ is independently hydrogen, a halogen, a hydrocarbyl, or a halohydrocarbyl; ac and dc are integers of 2 or more, and bc and cc are integers of 0 or more. Preferred hydrocarbyls and halohydrocarbyl can be linear, cyclic, or branched, and contain from 1 to 30 carbon atoms.

Preferred monocycloolefins according to formula 1 have from 4 to 12 carbon atoms, more preferably 5 to 10 carbon atoms. Specific representative cycloolefins according to formula 1 are as follows:

cyclobutene,
cyclopentene;
3-methylcyclopentene;
4-methylcyclopentene;
3,4-dimethylcyclopentene;
3,5-dimethylcyclopentene;
3-chlorocyclopentene;
cyclohexene;
3-methylcyclohexene;
4-methylcyclohexane;
3,4-dimethylcyclohexene;
3-chlorocyclohexene;
cycloheptene; and
cyclododecene.

Specific representative cycloolefins according to formula 2 are as follows:
bicyclo(2.2.2)hept-2-ene;
6-methylbicyclo(2.2.1)hept-2-ene;
5,6-dimethylbicyclo(2.2.1)hept-2-ene;
1-methylbicyclo(2.2.1)hept-2-ene;
6-ethylbicyclo(2.2.1)hept-2-ene;
6-n-butylbicyclo(2.2.1)hept-2-ene;
6-isobutylbicyclo(2.2.1)hept-2-ene;
7-methylbicyclo(2.2.1)hept-2-ene;
5-phenylbicyclo(2.2.1)hept-2-ene;
5-methyl-5-phenylbicyclo(2.2.1)hept-2-ene;
5-benzylbicyclo(2.2.1)hept-2-ene;
5-tolylbicyclo(2.2.1)hept-2-ene;
5-ethylphenylbicyclo(2.2.1)hept-2-ene;
5-isopropylphenylbicyclo(2.2.1)hept-2-ene;
5-alpha-naphthylbicyclo(2.2.1)hept-2-ene;
5-acetoracenylbicyclo(2.2.1)hept-2-ene;
tetracyclo(4.4.0.1$^{2,5}$.1$^{7,10}$)-3-dodecene;
2-methyltetracyclo(4.4.0.1$^{2,5}$.1$^{7,10}$)-3-dodecene;
2-ethyltetracyclo(4.4.0.1$^{2,5}$.1$^{7,10}$)-3-dodecene;
2-propyltetracyclo(4.4.0.1$^{2,5}$.1$^{7,10}$)-3-dodecene;
2-hexyltetracyclo(4.4.0.1$^{2,5}$.1$^{7,10}$)-3-dodecene;
2-stearyltetracyclo(4.4.0.1$^{2,5}$.1$^{7,10}$)-3-dodecene;
2,3-dimethyltetracyclo(4.4.0.1$^{2,5}$.1$^{7,10}$)-3-dodecene;
2-methyl-3-ethyltetracyclo(4.4.0.1$^{2,5}$.1$^{7,10}$)-3-dodecene;
2-chlorotetracyclo(4.4.0.1$^{2,5}$.1$^{7,10}$)-3-dodecene;
2-bromotetracyclo(4.4.0.1$^{2,5}$.1$^{7,10}$)-3-dodecene;
2,3-dichlorotetracyclo(4.4.0.1$^{2,5}$.1$^{7,10}$)-3-dodecene;
2-cyclohexyltetracyclo(4.4.0.1$^{2,5}$.1$^{7,10}$)-3-dodecene;
2-n-butyltetracyclo(4.4.0.1$^{2,5}$.1$^{7,10}$)-3-dodecene;
2-isobutyltetracyclo(4.4.0.1$^{2,5}$.1$^{7,10}$)-3-dodecene;
5,10-dimethyltetracyclo(4.4.0.1$^{2,5}$.1$^{7,10}$)-3-dodecene;
2,10-dimethyltetracyclo(4.4.0.1$^{2,5}$.1$^{7,10}$)-3-dodecene;

11,12-dimethyltetracyclo(4.4.0.1$^{2,5}$.1$^{7,10}$)-3-dodecene;
2,7,9-trimethyltetracyclo(4.4.0.1$^{2,5}$.1$^{7,10}$)-3-dodecene;
9-ethyl-2,7-dimethyltetracyclo(4.4.0.1$^{2,5}$.1$^{7,10}$)-3-dodecene;
9-isobutyl-2,7-dimethyltetracyclo(4.4.0.1$^{2,5}$.1$^{7,10}$)-3-dodecene;
9,11,12-trimethyltetracyclo(4.4.0.1$^{2,5}$.1$^{7,10}$)-3-dodecene;
9-ethyl-11,12-dimethyltetracyclo(4.4.0.1$^{2,5}$.1$^{7,10}$)-3-dodecene;
9-isobutyl-11,12-dimethyltetracyclo(4.4.0.1$^{2,5}$.1$^{7,10}$)-3-dodecene;
5,8,9,10-tetramethyltetracyclo(4.4.0.1$^{2,5}$.1$^{7,10}$)-3-dodecene;
8-methyltetracyclo(4.4.0.1$^{2,5}$.1$^{7,10}$)-3-dodecene;
8-ethyltetracyclo(4.4.0.1$^{2,5}$.1$^{7,10}$)-3-dodecene;
8-propyltetracyclo(4.4.0.1$^{2,5}$.1$^{7,10}$)-3-dodecene;
8-hexyltetracyclo(4.4.0.1$^{2,5}$.1$^{7,10}$)-3-dodecene;
8-stearyltetracyclo(4.4.0.1$^{2,5}$.1$^{7,10}$)-3-dodecene;
8,9-dimethyltetracyclo(4.4.0.1$^{2,5}$.1$^{7,10}$)-3-dodecene;
8-methyl-9-ethyltetracyclo(4.4.0.1$^{2,5}$.1$^{7,10}$)-3-dodecene;
8-chlorotetracyclo(4.4.0.1$^{2,5}$.1$^{7,10}$)-3-dodecene;
8-bromotetracyclo(4.4.0.1$^{2,5}$.1$^{7,10}$)-3-dodecene;
8-fluorotetracyclo(4.4.0.1$^{2,5}$.1$^{7,10}$)-3-dodecene;
8,9-dichlorotetracyclo(4.4.0.1$^{2,5}$.1$^{7,10}$)-3-dodecene;
8-cyclohexyltetracyclo(4.4.0.1$^{2,5}$.1$^{7,10}$)-3-dodecene;
8-isobutyltetracyclo(4.4.0.1$^{2,5}$.1$^{7,10}$)-3-dodecene;
8-butyltetracyclo(4.4.0.1$^{2,5}$.1$^{7,10}$)-3-dodecene;
8-ethylidenetetracyclo(4.4.0.1$^{2,5}$.1$^{7,10}$)-3-dodecene;
8-ethylidene-9-methyltetracyclo(4.4.0.1$^{2,5}$.1$^{7,10}$)-3-dodecene;
8-ethylidene-9-ethyltetracyclo(4.4.0.1$^{2,5}$.1$^{7,10}$)-3-dodecene;
8-ethylidene-9-isopropyltetracyclo(4.4.0.1$^{2,5}$.1$^{7,10}$)-3-dodecene;
8-ethylidene-9-butyltetracyclo(4.4.0.1$^{2,5}$.1$^{7,10}$)-3-dodecene;
8-n-propylidenetetracyclo(4.4.0.1$^{2,5}$.1$^{7,10}$)-3-dodecene;
8-n-propylidene-9-methyltetracyclo (4.4.0.1$^{2,5}$.1$^{7,10}$)-3-dodecene;
8-n-propylidene-9-ethyltetracyclo(4.4.0.1$^{2,5}$.1$^{7,10}$)-3-dodecene;
8-n-propylidene-9-isopropyltetracyclo(4.4.0.1$^{2,5}$.1$^{7,10}$)-3-dodecene;
8-n-propylidene-9-butyltetracyclo(4.4.0.1$^{2,5}$.1$^{7,10}$)-3-dodecene;
8-isopropylidenetetracyclo(4.4.0.1$^{2,5}$.1$^{7,10}$)-3-dodecene;
8-isopropylidene-9-methyltetracyclo(4.4.0.1$^{2,5}$.1$^{7,10}$)-3-dodecene;
8-isopropylidene-9-ethyltetracyclo(4.4.0.1$^{2,5}$.1$^{7,10}$)-3-dodecene;
8-isopropylidene-9-isopropyltetracyclo(4.4.0.1$^{2,5}$.1$^{7,10}$)-3-dodecene;
8-isopropylidene-9-butyltetracyclo(4.4.0.1$^{2,5}$.1$^{7,10}$)-3-dodecene;
hexacyclo(6.6.1.1$^{3,6}$.1$^{10,13}$.0$^{2,7}$.0$^{9,14}$)-4-heptadecene;
12-methylhexacyclo(6.6.1.1$^{3,6}$.1$^{10,13}$.0$^{2,7}$.0$^{9,14}$)-4-heptadecene;
12-ethylhexacyclo(6.6.1.1$^{3,6}$.1$^{10,13}$.0$^{2,7}$.0$^{9,14}$)-4-heptadecene;
12-isobutylhexacyclo(6.6.1.1$^{3,6}$.1$^{10,13}$.0$^{2,7}$.0$^{9,14}$)-4-heptadecene;
1,6,10-trimethyl-12-isobutylhexacyclo(6.6.1.1$^{3,6}$.1$^{10,13}$.0$^{2,7}$.0$^{9,14}$)-4-heptadecene;
octacyclo(8.8.0.1$^{2,9}$.1$^{4,7}$.1$^{11,18}$.1$^{13,16}$.0$^{3,8}$.0$^{12,17}$)-5-dococene;
15-methyloctacyclo(8.8.0.1$^{2,9}$.1$^{4,7}$.1$^{11,18}$.1$^{13,16}$.0$^{3,8}$.0$^{12,17}$)-5-dococene; and
15-ethyloctacyclo(8.8.0.1$^{2,9}$.1$^{4,7}$.1$^{11,18}$.1$^{13,16}$.0$^{3,8}$.0$^{12,17}$)-5-dococene.

Specific representative cycloolefins according to formula 3 are as follows:
tricyclo(4.3.0.1$^{2,5}$)-3-decene;
2-methyltricyclo(4.3.0.1$^{2,5}$)-3-decene;
5-methyltricyclo(4.3.0.1$^{2,5}$)-3-decene;
tricyclo(4.4.0.1$^{2,5}$)-3-undecene;
10-methyltricyclo(4.4.0.1$^{2,5}$)-3-undecene;
pentacyclo(6.5.1.1$^{3,6}$.0$^{2,7}$.0$^{9,13}$)-4-pentadecene;
pentacyclo(4.7.0.1$^{2,5}$.0$^{8,13}$.1$^{9,12}$)-3-pentadecene;
methyl-substituted pentacyclo(4.7.0.1$^{2,5}$.0$^{8,13}$.1$^{9,12}$)-3-pentadecene;
1,3-dimethylpentacyclo(6.5.1.1$^{3,6}$.0$^{2,7}$.0$^{9,13}$)-4-pentadecene;
1,6-dimethylpentacyclo (6.5.1.1$^{3,6}$.0$^{2,7}$.0$^{9,13}$)-4-pentadecene;
14,15-dimethylpentacyclo(6.5.1.1$^{3,6}$.0$^{2,7}$.0$^{9,13}$)-4-pentadecene;
pentacyclo(6.6.1.1$^{3,6}$.0$^{2,7}$.0$^{9,14}$)-4-hexadecene;
1,3-dimethylpentacyclo(6.6.1.1$^{3,6}$.0$^{2,7}$.0$^{9,14}$)-4-hexadecene;
1,6-dimethylpentacyclo(6.6.1.1$^{3,6}$.0$^{2,7}$.0$^{9,14}$)-4-hexadecene;
15,16-dimethylpentacyclo(6.6.1.1$^{3,6}$.0$^{2,7}$.0$^{9,14}$)-4-hexadecene;
heptacyclo(8.7.0.1$^{2,9}$.1$^{4,7}$.1$^{11,17}$.0$^{3,8}$.0$^{12,16}$)-5-eicosene;
heptacyclo(7.8.0.1$^{3,6}$.0$^{2,7}$.1$^{10,17}$.0$^{11,16}$.1$^{12,13}$)-4-eicosene;
heptacyclo(8.8.0.1$^{2,9}$.1$^{4,7}$.1$^{11,18}$.0$^{3,8}$.0$^{12,17}$)-5-heneicosene;
nonacyclo(9.10.1.1$^{4,7}$.0$^{3,8}$.0$^{2,18}$.0$^{12,21}$.1$^{13,20}$.0$^{14,19}$.1$^{15,18}$)-5-pentacosene;
1,4-methano-1,1a,4,4a-tetrahydrofluorene;
1,4-methano-1,1a,4,4a,5,10a-hexahydroanthracene; and
cyclopentadiene-acenaphthylene adduct.

In another embodiment, suitable cycloolefins include cyclic and polycyclic non-conjugated dienes and trienes having a cyclized carbon-carbon double bond which is polymerizable. When the cycloolefin is a cyclic diene or triene, the resulting copolymer can contain pendant cyclized double bonds which are potential sites for functionalization, hydrogenation, or other reactions. Specific representative examples of such cyclopolyenes include the following:
ethylene norbornene
5-vinyl-2-norbornene
5-ethylidene-2-norbornene
dicyclopentadiene;
tricylopentadiene;
4-methylcyclo-1,4-octadiene;
4-methyl-5-propylcyclo-1,4-octadiene;
5-methylcyclopentadiene;
4-methyl-5-ethyldicyclopentadiene;
5-isopropyldicyclopentacliene;
1,5,9-cyclododecatriene;

2-methyl-2,5-norbornadiene; 5-methyl-2,5-norbornadiene;

2-propyl-2,5-norbornadiene;

3-heptyl-2,5-norbornadiene;

2-ethyl-3-propyl-2,5-norbornadiene;

2-(1'5'-dimethylhexene-4-yl)-2,5-norbornadiene;

2-ethylbicyclo(2.2.2)-2,5-octadiene;

2-methyl-3-ethyl-bicyclo(2.2.2)-2,5-octadiene;

2-hexylbicyclo(2.2.2)-2,5-octadiene;

2-(1',5'-dimethylhexenyl-4)bicyclo(2.2.2)-2,5-octadiene;

1-isopropylidenebicyclo(4.4.0)-2,6-decadiene;

3-ethylenebicyclo(3.2.0)-2,6-heptadiene;

3-methylbicyclo(3.3.0)-2,6-octadiene;

pentacyclo(6.5.1.1$^{3,6}$.0$^{2,7}$.0$^{9,13}$)-4,10-pentadocadiene;

3-methyl-4,7,8,9-tetrahydroindene;

6-methyl-4,7,8,9-tetrahydroindene; and 2-propyl-4,7,8,9-tetrahydroindene.

Dicyclopentadiene or similar cycloolefins or cyclopolyenes can be polymerized from either the endo- form, the exo- form, or mixtures thereof. In another preferred embodiment, comonomers of exo-isomers are preferred over endo-isomers due to a preferential and more facile incorporation of the exo-isomer. Incorporation rates preferably increase by as much as 25 percent, more preferably by 50 percent or more, even more preferably by 75 percent or more, when the exo-isomer mole percent incorporation is compared to the endo-isomer mole percent incorporation. A cyclic comonomer incorporation rate of up to 70 mole percent has been demonstrated using exo-dicyclopentadiene as compared to 40 mole percent endo-dicyclopentadiene incorporation using the same experimental conditions. This wider range of composition translates into tackifier resins which have a broader range of adjustable properties. This flexibility is desirable in that it allows one to design tackifiers for a variety of adhesive formulations or applications.

Catalyst Systems

Preferred catalysts of the invention, for example, are typically those bulky ligand transition metal complexes derivable from the formula:

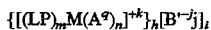

where L is a bulky ligand bonded to M, p is the anionic charge of L and m is the number of L ligands and m is 1, 2 or 3; A is a ligand bonded to M and capable of inserting an olefin between the M—A bond, q is the anionic charge of A and n is the number of A ligands and n is 1, 2, 3 or 4, M is a metal, preferably a transition metal, and (p×m)+(q×n)+k corresponds to the formal oxidation state of the metal center; where k is the charge on the cation and k is 1, 2, 3 or 4, and B' is a chemically stable, non-nucleophillic anionic complex, preferably having a molecular diameter of 4Å or greater and j is the anionic charge on B', h is the number of cations of charge k, and i the number of anions of charge j such that h×k=j×i.

Any two L and/or A ligands may be bridged to each other. The catalyst compound may be full-sandwich compounds having two or more ligands L, which may be cyclopentadienyl ligands or substituted cyclopentadienyl ligands, or half-sandwich compounds having one ligand L, which is a cyclopentadienyl ligand or heteroatom substituted cyclopentadienyl ligand or hydrocarbyl substituted cyclopentadienyl ligand such as an indenyl ligand, a benzindenyl ligand or a fluorenyl ligand and the like or any other ligand capable of $\eta^5$ bonding to a transition metal atom. One or more of these bulky ligands is π-bonded to the transition metal atom. Each L can be substituted with a combination of substituents, which can be the same or different. Non-limiting examples of substituents include hydrogen or a linear, branched or cyclic alkyl, alkenyl or aryl radical or combination thereof having from 1 to 30 carbon atoms. The substituent can also be substituted with hydrogen or a linear, branched or cyclic alkyl, alkenyl or aryl radical having from 1 to 30 carbon atoms. L may also be other types of bulky ligands including but not limited to bulky amides, phosphides, alkoxides, aryloxides, imides, carbolides, borollides, porphyrins, phthalocyanines, corrins and other polyazomacrocycles. The metal atom may be a Group 4, 5 or 6 transition metal or a metal from the lanthanide and actinide series, preferably the transition metal is of Group 4. Other ligands may be bonded to the transition metal, such as a leaving group, such as but not limited to weak bases such amines, phosphines, ether and the like. In addition to the transition metal, these ligands may be optionally bonded to A or L. Non-limiting examples of catalyst components and catalyst systems are discussed in for example, U.S. Pat. Nos. 4,530,914, 4,871,705, 4,937,299, 5,124,418, 5,017,714, 5,120,867, 5,278,264, 5,278,119, 5,304,614, 5,324,800, 5,347,025, 5,350,723, 5,198,401, 5,384,299, 5,391,790 and 5,391,789 all of which are herein fully incorporated by reference. Also, the disclosures of EP-A-0 591 756, EP-A-0 520 732, EP-A-0 420 436, WO 91/04257 WO 92/00333, WO 93/08221, WO 93/08199 and WO 94/01471 are all fully incorporated herein by reference.

In one embodiment, the activated catalyst of the invention is formed from a catalyst compound represented by the general formula:

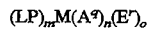

where L, M, A, and p, m, q and n are as defined above and E is an anionic leaving group such as but not limited to hydrocarbyl, hydrogen, halide or any other anionic ligands; r is the anionic charge of E and o is the number of E ligands and o is 1, 2, 3 or 4 such that (p×m)+(q×n)+(r×o) is equal to the formal oxidation state of the metal center, and an aluminum alkyl, alumoxane, modified alumoxane or any other oxy-containing organometallic compound or non-coordinating ionic activators, or a combination thereof.

Further, the catalyst component of the invention includes monocyclopentadienyl heteroatom containing compounds. This heteroatom is activated by either an alumoxane, modified alumoxane, a non-coordinating ionic activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,227,440 and 5,264,405 and EP-A-0 420 436, all of which are fully incorporated herein by reference. Additionally it is within the scope of this invention that the metallocene catalysts and catalyst systems may be those described in U.S. Pat. Nos. 5,064,802, 5,145,819, 5,149,819, 5,243,001, 5,239,022, 5,276,208, 5,296,434, 5,321,106, 5,329,031 and 5,304,614, PCT publications WO 93/08221, WO 93/08199 and WO95/07140 and EP-A-0 578 838, EP-A-0 638 595 all of which are herein incorporated by reference.

The preferred transition metal component of the catalyst of the invention are those of Group 4, particularly, titanium, zirconium and hafnium. The transition metal may be in any formal oxidation state, preferably +2, +3 or +4 or a mixture thereof, preferably +4.

In another embodiment the catalyst component is represented by one of the formula (I):

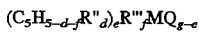

wherein M is a Group 4, 5, 6 transition metal, at least one $(C_5H_{5-d-f}R''_d)$ is an unsubstituted or substituted cyclopentadienyl ligand bonded to M, each R", which can be the same or different is hydrogen or a substituted or unsubstituted hydrocarbyl having from 1 to 30 carbon atoms or combinations thereof or two or more carbon atoms are joined together to form a part of a substituted or unsubstituted ring or ring system having 4 to 30 carbon atoms, R''' is one or more or a combination of carbon, germanium, silicon, phosphorous or nitrogen atoms containing radical bridging two $(C_5H_{5-d-f}R''_d)$ rings, or bridging one $(C_5H_{5-d-f}R''_d)$ ring to M; each Q which can be the same or different is a hydride, substituted or unsubstituted hydrocarbyl having from 1 to 30 carbon atoms, halogen, alkoxides, aryloxides, amides, phosphides or any other univalent anionic ligand or combination thereof; two Q can be an alkylidene ligand or cyclometallated hydrocarbyl ligand or other divalent anion chelating ligand having from 1 to 30 carbon atoms, where g is an integer corresponding to the formal oxidation state of M, d is 0, 1, 2, 3, 4 or 5, f is 0 or 1 and e is 1, 2 or 3.

In another preferred embodiment of this invention the catalyst component is represented by the formula (II):

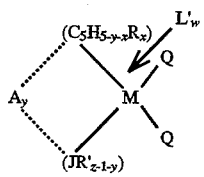

wherein M is Ti, Zr or Hf; $(C_5H_{5-y-x}R_x)$ is a cyclopentadienyl ring which is substituted with from 0 to 5 substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen atom, $C_1$–$C_{20}$ hydrocarbyl-substituted metalloid radicals wherein the metalloid is selected from the Group 14 of the Periodic Table of Elements, and halogen radicals or $(C_5H_{5-y-x}R_x)$ is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of $C_1$–$C_{20}$ hydrocarbyl radicals wherein one or more hydrogen atoms is replaced by a halogen atom, y is 0 or 1, and "z" is the coordination number of the element J;

each Q is, independently any univalent anionic ligand such as halogen, hydride, or substituted or unsubstituted $C_1$–$C_{30}$ hydrocarbyl, alkoxide, aryloxide, amide or phosphide, provided that two Q may be an alkylidene, a cyclometallated hydrocarbyl or any other divalent anionic chelating ligand;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q.

For purposes of this patent specification and appended claims all the transition metal compounds or catalyst components described above are generally referred to as "metallocenes".

Preferred metallocene catalyst systems are based on group IV and V transition metal compound; more preferably titanium, zirconium, or hafnium; even more preferably zirconium. Perferred ligand structures in metallocene catalyst systems include cyclopentadienyl, indenyl, tetrahydroindenyl, and amido. Preferred catalyst activators include but are not limited to alumoxane, such as methylalumoxane, or a non-coordinating anion, such as dimethylanilinium tetrakis (pentafluorophenyl) boron, used in combination with one or more of the following:

dimethylsilanyl bis(methylcyclopentadienyl)zirconium dichloride;

dimethylsilanyl bis(cyclopentadienyl)zirconium dichloride;

bis(methylcyclopentadienyl)zirconium dichloride;

bis(cyclopentadienyl)zirconium dichloride;

dimethylsilanyl bis(tetrahydroindenyl)zirconium dichloride;

rac-dimethylsilyl-bis(tetrahydroindenyl)zirconium dimethyl;

dimethylsilanyl bis(methylcyclopentadienyl)zirconium dimethyl;

dimethylsilanyl bis(cyclopentadienyl)zirconium dimethyl;

bis(methylcyclopentadienyl)zirconium dimethyl;

bis(cyclopentadienyl)zirconium dimethyl;

dimethylsilanyl[(tetramethylcyclopentadienyl)(dodecylamino)]titanium dichloride; and cyclopentadienyl (t-butoxy)zirconium dichloride For the purposes of this patent specification and appended claims, the terms "cocatalysts" and "activators" are used interchangeably and are defined to be any compound or component which can activate a metallocene compound as defined above, for example, a Lewis acid or a non-coordinating ionic activator or ionizing activator or any other compound that can convert a neutral metallocene catalyst component to a metallocene cation. It is within the scope of this invention to use alumoxane as an activator, and/or to also use ionizing activators, neutral or ionic, such as tri(n-butyl)ammonium tetrakis(pentaflurophenyl) boron or a trisperfluorophenyl boron metalloid precursor which ionize the neutral metallocene compound.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529 and EP-A-0 561 476, EP-B1-0 279 586, EP-A-0 594-218 and WO 94/10180, all of which are fully incorporated herein by reference.

Ionizing compounds may contain an active proton, or some other cation associated with but not coordinated or only loosely coordinated to the remaining ion of the ionizing compound. Such compounds and the like are described in EP-A-0 570 982, EP-A-0 520 732, EP-A-0 495 375, EP-A-0 426 637, EP-A-500 944, EP-A-0 277 003 and EP-A-0 277

004, and U.S. Pat. Nos. 5,153,157, 5,198,401, 5,066,741, 5,206,197, 5,241,025, 5,387,568 and 5,384,299 are all herein fully incorporated by reference. Combinations of activators are also contemplated by the invention, for example, alumoxanes and ionizing activators in combinations, see for example, WO 94/07928, U.S. application Ser. No. 08/155,313 filed Nov. 19, 1993 and U.S. Pat. No. 5,153,157 all of which are herein fully incorporated by reference.

In an embodiment of the invention two or more metallocenes as described above can be combined to form a catalyst system useful in the invention. For example, those mixed catalysts described in U.S. Pat. No. 5,281,679 and U.S application Ser. No. 138,818 filed Oct. 14, 1993 both of which are fully incorporated herein by reference. In another embodiment of the catalyst system of the invention combinations of one or more of catalyst components of general formula (I) and/or (II) are contemplated. In one embodiment, metallocene catalyst components can be combined to form the blend compositions as described in PCT publication WO 90/03414 published Apr. 5, 1990, fully incorporated herein by reference. In yet another embodiment mixed metallocenes as described in U.S. Pat. Nos. 4,937,299 and 4,935,474, both are herein fully incorporated herein by reference, can be used to produce polymers having a broad molecular weight distribution and/or a multimodal molecular weight distribution.

In another embodiment of the invention at least one metallocene catalyst can be combined with a non-metallocene or traditional Ziegler-Natta catalyst or catalyst system, non-limiting examples are described in U.S. Pat. Nos. 4,701,432, 5,124,418, 5,077,255, 5,183,867, 5,391,660 and 5,395,810 all of which are incorporated herein by reference.

For purposes of this patent specification the terms "carrier" or "support" are interchangeable and can be any support material, preferably a porous support material, such as for example, talc, inorganic oxides, inorganic chlorides, for example magnesium chloride, and resinous support materials such as polystyrene or polystyrene divinyl benzene polyolefins or polymeric compounds or any other organic or inorganic support material and the like, or mixtures thereof.

The preferred support materials are inorganic oxide materials, which include those of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alma and magnesia, titania, zirconia, and the like.

The catalyst system of the invention can be made in a variety of different ways as previously described. In one embodiment the catalyst is unsupported, see U.S. Pat. No. 5,317,036 and EP-A-0 593 083 incorporated herein by reference. In the preferred embodiment, the catalyst system of the invention is supported. Examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, 5,346,925 and U.S. patent application Ser. Nos. 138,818, filed Oct. 14, 1993, 170,108, filed Dec. 20, 1993, 182,244, filed Jan. 14, 1994, 233,668, filed Apr. 26, 1994, 265,533, filed Jun. 24, 1994, 265,532, filed Jun. 24, 1994, 271,598, filed Jul. 7, 1994, 287,327, filed Aug. 8, 1994, and U.S. patent application Ser. No. 08/285,380, filed Aug. 3, 1994, all of which are herein fully incorporated by reference.

In one embodiment of the process of the invention, olefin(s), preferably ethylene and $C_3$ to $C_{20}$ alpha-olefins, preferably ethylene or propylene or combinations thereof are prepolymerized in the presence of the catalyst or catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833, 5,283,278 and 4,921,825 and EP-B-0 279 863 all of which are herein fully incorporated by reference.

In another embodiment of the invention, the supported catalyst system of the invention includes an antistatic agent or surface modifier, for example, those described in U.S. Patent No. 5,283,278 and U.S. patent application Ser. No. 08/322,675, filed Oct. 13, 1994, which are fully incorporated herein by reference. Non-limiting examples of antistatic agents and surface modifiers include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention, however, it is preferred that it is added after the supported catalyst system of the invention is formed, in either a slurry or dried state.

A method for producing a supported catalyst for the invention is described below and can be found in U.S. application Ser. Nos. 265,533, filed Jun. 24, 1994 and 265,532, filed Jun. 24, 1994, both are herein fully incorporated by reference in their entirety.

The mole ratio of the metal of the activator component to the transition metal of the metallocene component is in the range of ratios between 0.3:1 to 1000:1, preferably 20:1 to 800:1, and most preferably 50:1 to 500:1. Where the activator is an aluminum free ionizing activator such as those based on the anion tetrakis(pentafluorophenyl)boron as previously described, the mole ratio of the metal of the activator component to the transition metal component is preferably in the range of ratios between 0.3:1 to 3:1.

In another embodiment the catalyst loading in millimoles (mmoles) of metallocene to weight of support material in grams (g) is in the range of from about 0.001 to about 2.0 mmoles of metallocene per g of support material, preferably from about 0.005 to about 1.0, more preferably from about 0.005 to 0.5 and most preferably from about 0.01 to 0.15.

Process Conditions

The tackifier resins of this invention are produced using metallocene catalyst systems in a polymerization or copolymerization process in gas, slurry, solution, bulk, or high pressure phase, preferably in solution phase.

In a solution process, the catalyst components and the monomers are typically suspended or dissolved in a solvent and introduced into a reaction vessel. Temperatures range from 0° C. to 250° C., preferably 20° C. to 175° C., preferably 55° C. to 220° C., even more preferably 60° C. to 120° C., most preferably 75° C. to 110° C., and pressures run from atmospheric pressure up to about 4,000 psi (28 MPa) or even as high as 2000 to 3000 bar. The instant processes typically run according to solution protocols known to those of ordinary skill in the art. Preferred solvents include but are not limited to aliphatic hydrocarbon solvents, parafinnic solvents and the like. Examples include hexane, 2-methylpentane, isopentane, Isopar™, (hydrocarbon solvents available from Exxon Chemical Company), benzene, toluene and the like. In addition the polymerization can be performed without solvent, such as in bulk polymerizations using standard techniques known in the art.

To obtain tackifiers from the polymerization catalyst systems and conditions described above, one will select conditions that will produce low molecular weight and preferably high comonomer incorporation. Conditions that will produce low molecular weight, while holding other process variables substantially constant, include: increasing reaction temperatures to increase the incidence of chain transfer or chain termination (for example, 80° C. versus 60° C. for dimethyl dimethylsilanyl bis(tetrahydroindenyl) zirconium as in examples 24 and 25); introducing chain transfer agents, such as hydrogen or other known coordination polymerization chain termination agents; (for example, see examples 45 and 46 in Tables 1 and 4) increasing the amount of cyclic comonomer in the feed, (for example, changing the alpha-olefin:cyclic olefin ratio from 8:1 to 4:1, see examples 51 and 52); increasing the catalyst concentration, or employing monomers that are capable of readily undergoing beta-hydride elimination, (for example, propylene or higher alpha-olefins).

In a preferred embodiment to obtain a low molecular weight tackifier, the alumoxane is combined with the cylcopentadienyl transition metal compound or derivative thereof in an aluminum to metal ratio of 1,500:1 to 3000:1. This does not mean that one of ordinary skill in the art could not run the reaction at a ratio of 500:1 or less, however, if one did wish to use that ratio of catalyst, one would use other methods to limit molecular weight if required. If the aluminum to metal ratio is low other factors such as temperature, presence of hydrogen, and the like will control $M_n$.

Heretofore the above low molecular weight conditions were known to produce low comonomer incorporation and low $T_g$'s in conjunction with the low molecular weight. In the instant invention, however, the use of the single site catalysts enables one to achieve high comonomer incorporation and high $T_g$'s in spite of the low molecular weight.

Thus in the practice of this invention one of ordinary skill in the art will also use conditions known to promote comonomer incorporation including but not limited to feeding higher volumes of comonomer into the reactor.

Thus, for example, if one of ordinary skill in the art chose a single site catalyst known to produce high molecular weight isotactic polymer then more comonomer could be used relative to the monomer optionally in conjunction with hydrogen so as to produce a lower molecular weight, amorphous polymer with high comonomer content, rather than a high molecular weight, isotactic crystalline polymer. In contrast if a catalyst known to produce amorphous polymer is selected, then one of ordinary skill in the art would use methods such as increasing the reaction temperature to produce the desired low $M_n$, high $T_g$ polymer. As one can surmise depending on the catalyst polymerization conditions, a variety of polymers can be produced that have low $M_n$ and high $T_g$.

Tackifier Resin

A tackifier resin as described in this application is a hydrocarbon copolymer that when blended with a base polymer will have the effect of producing an adhesive blend that has a lower $M_n$, higher $T_g$, and lower viscosity than the unblended base polymer. For block copolymers having multiple $T_g$s, a tackifier will associate with and increase the $T_g$ of at least one phase. A tackifier resin will have the further effect of improving one or more adhesive performance attributes over that of the base polymer, particularly having the effect of improving the balance of properties such as adhesion (e.g. 180° peel), cohesion (e.g.-SAFT), and color (e.g.-Saybolt). A base polymer may be a single polymer or a blend of two or more polymers, but each component of base the polymer blend will individually have a $M_n$ greater than 10,000.

In a preferred embodiment the olefin copolymer tackifier resin is amorphous and compatible with the polymer to be tackified. Amorphous is defined to be a substantially non-crystalline and lacking a defined melting point or melting transition. Non-crystalline is defined as containing 10% crystallinity or less as measured DSC, X-ray diffraction, or other methods known to those skilled in the art. Compatible as used herein means that the tackifier will associate with at least one phase of the base polymer to be tackified.

The tackifiers of this invention preferably have a number average molecular weight of less than about 5,000, preferably below about 2,000, more preferably 1,600, even more preferably below about 1,200, even more preferably in the range of from about 200 to about 1,000, most preferably in the range of from about 300 and about 1000.

The tackifiers of this invention preferably have a $T_g$ greater than or equal to about 0° C. to less than about 100° C., more preferably greater than or equal to about 20° C. to less than about 85° C., even more preferably from about 30° C. to about 80° C., even more preferably from about 30° C. to about 60° C., most preferably from about 32° C. to about 50° C., most preferably about 45° C. or more.

The tackifiers produced herein preferably have about 5 mole percent or more incorporation of cyclic comonomer, more preferably in the range of from about 20 mole percent to about 95 mole percent, even more preferably in the range of from about 35 mole percent to about 95 mole percent, even more preferably from about 40 mole percent to about 90 mole percent, most preferably from about 50 mole percent to about 80 mole percent.

The tackifiers produced herein preferably have a $M_w/M_n$ of 3 or less, preferably 2.5 or less.

Furthermore, in a preferred embodiment these tackifiers have low color. Tackifiers produced according to this invention preferably have Saybolt colors of +15 or higher, more preferably +18 or higher, even more preferably +20 or higher.

Adhesive Compositions

The tackifiers of this invention can be combined with other polymers, referred to herein as "base polymers", to produce adhesive compositions. Such base polymers can be plastics, thermoplastics, elastomers, plastomers, or combinations thereof. Preferred adhesive compositions comprising these tackifiers include hot melt adhesives, pressure sensitive adhesives, hot melt pressure sensitive adhesives, and contact adhesives.

A base polymer, at least one tackifier, and optionally one or more additives can be combined to produce a variety of adhesives, such as hot melt adhesives, pressure sensitive adhesives, hot melt pressure sensitive adhesives, contact adhesives, structural adhesives, and the like.

The tackifier and the base polymer can be combined to produce a variety of adhesives, such as hot melt adhesives, pressure sensitive adhesives, hot melt pressure sensitive adhesives, structural adhesives and the like. For example, the tackifier may be combined with the base polymer at levels of 50 to 150 parts by weight of the tackifier to 100 parts of the base polymer to obtain a pressure sensitive adhesive. In a preferred embodiment and depending on the application desired, the tackifier can be present in combination with the base polymer at anywhere from 1 part by weight to 300 parts by weight of tackifier per 100 parts base polymer. In addition additives may be present in the adhesive compositions. Typical additives include, dyes, pigments, fillers, waxes, plasticizers, anti-oxidants, heat stabilizers, light stabilizers, additional tackifiers and the like. In a preferred embodiment oil and or plasticizer is present at up to 30 phr, preferably from about 5 to about 25 phr.

In one embodiment, the base polymer is at least one random copolymer. Preferred random copolymers include co-, ter- or tetra-polymers of olefins such as, ethylene, alpha-olefins, acrylics, acrylates, acetates, and the like. Preferred alpha-olefins contain 2 to 20 carbon atoms, more preferably 2 to 8, even or more preferably 2 to 6. Examples of useful ethylene alpha-olefin copolymers include ethylene/ hexene-1, ethylene/butene-1, ethylene/4-methyl-pentene-1, ethylene/octene-1 copolymers and the like. Preferred polar comonomers include vinyl acids, vinyl esters, vinyl alcohols, such as ethacrylic acid, crotonic acid, vinyl acetic acid, angelic acid, maleic acid, fumaric acid, ketones, carbon monoxide, 2-hydroxy ethyl acrylate, 2-hydroxy ethyl methacrylate, and the like. Preferred examples include alkylmethacrylates, alkylacrylates, alkylmethacrylic acids, and alkylacrylic acids. Even more preferable examples of suitable monomers include vinyl acetate, acrylic acid, methacrylic acid, methacrylate, ethyl methacrylate, methyl methacrylate, ethyl acrylate, and methyl acrylate. These copolymers are produced by many processes known in the art, such as, but not limited to, free radical polymerization, and are available commercially in many forms. For example, ethylene-vinyl acetate copolymers are produced by high pressure free radical polymerization and is available from Exxon Chemical Company, Houston, Tex., under the Escorene™ trade name. These Escorene™ EVA copolymers have weight percent comonomer in the range of about 14 to about 33 and a melt index in the range of about 2.3 to about 2500 dg/min. (ASTM D-1238, condition E, 190° C. and 2.16 kg). Typical random copolymers which can be combined with the tackifiers produced herein include but are not limited to ethylene-vinyl acetate, ethylene-propylene rubber, ethylene-propylene-diene termonomer rubber, silicone, butyl rubber, copolymers of isobutylene, and U.S. patent application Ser. No. 08/285,380, filed Aug. 3, 1994 and and isoolefin-paraalkyl-styrene copolymers. Typical random copolymers contain an alpha-olefin monomer in the range of from about 65 to about 99.5 mole percent of the random copolymers, more preferably from about 70 to about 98.5 mole percent, even more preferably from about 80 to about 95 mole percent. In one embodiment, preferred random copolymers possess a degree of crystallinity of at least 5 weight percent, preferably at least 15 weight percent, more preferably at least 20 weight percent, as measured by DSC.

In another embodiment, the base polymer is at least one homopolymer. Preferred homopolymers to be combined with the new tackifer resins include but are not limited to polyethylene, polypropylene, polyvinyl chloride, natural rubber, polyisoporene, nitrile rubber, polychloroprene rubber, polyisobutylene elastomers, polyurethane, polybutadiene, and polystyrene. Preferred homopolymers possess a degree of crystallinity of at least 5 weight percent, preferably at least 15 weight percent, more preferably at least 20 weight percent, as measured by DSC.

In yet another embodiment, the base coploymer is at least one block copolymer. One class of preferred block copolymers to be blended with the new tackifiers are those based on styrene, particularly block copolymers comprising styrenic blocks and diene blocks in an A—B—A or $(A)_nB$ configuration. A is preferably a poly(styrene) or a poly (substituted styrene) block. The A monomers preferably constitute from about 10 to about 55 weight percent of the block copolymer, more preferably from about 45 to about 50 weight percent, even more preferably from about 18 to about 45 weight percent. B is preferably a polymer of a $C_3$ to $C_{30}$ diene, preferably isoprene and/or butadiene. Such polymers are commercially available under the trades names KRATON 1107™, KRATON 1101™, VECTOR 4111™ and VECTOR 4411™, VECTOR 446 1™. Other grades of KRATON™ and VECTOR™ polymers are also useful for blending with the tackifiers produced herein. (KRATON™ and VECTOR™ polymers are available from Shell Chemical Company and DEXCO Polymers, respectively.)

In one embodiment, a block copolymer is used as the base polymer, preferably to form a pressure sensitive adhesive. The block copolymer is preferably present in the range of from about 10 weight percent to about 90 weight percent, more preferably from about 20 weight percent to about 80 weight percent, most preferably from about 30 weight percent to about 70 weight percent. The tackifier is preferably present in the range of from about 10 weight percent to about 90 weight percent, more preferably from about 20 weight percent to about 80 weight percent, even more preferably from about 30 weight percent to about 70 weight percent, most preferably from about 40 weight percent to about 60 weight percent. The total mount of all additives is preferably in the range of from 0 weight percent to about 50 weight percent, more preferably from about 0.5 weight percent to about 40 weight percent, even more preferably from about 1 weight percent to about 30 weight percent, most preferably from about 5 weight percent to about 15 weight percent. Preferred tackifiers for this embodiment comprise propylene and dicyclopentadiene, norbornene, or ethylidene norbornene.

The components of the pressure sensitive adhesive composition can be blended by ordinary methods known in the art for such as melt blending, extruder blending, or blending in solution.

In another embodiment, at least one of a random copolymer, a block copolymer, or a homopolymer is used as the base polymer, preferably to form a hot melt adhesive. The tackifier is preferably present in the range of from about 10 to about 950 phr, more preferably ranging from greater than 20 phr to less than 500 phr, where phr is parts by weight per hundred parts by weight of the base polymer. The total amount of all additives is preferably in the range of from 0 to 500 phr, more preferably from 0.5 to 400 phr, even more preferably from 1 to 300 phr, most preferably from 5 to 150 phr. Preferred tackifiers for this embodiment comprise propylene and dicyclopentadiene, norbornene, or ethylidene norbornene. Preferred HMA blends have a viscosity in the range of from 300 to 300,000 cp at 350° F. (0.3 to 200 Pa*s at 177° C.), preferably from 500 to 200,000 cp at 350° F. (0.5 to 100 Pa*s at 177° C.).

The components of the hot melt adhesive composition can be blended by ordinary methods known in the art for blending ethylene polymers, tackifiers, and the like. For example, an ethylene-vinyl acetate copolymer can be placed in a receptacle, heated, and stirred. Tackifier can be added to the receptacle so that a uniform dispersion is obtained. The blends can be produced by mixing the components using any suitable mixing device at a temperature above the melting point of the components, e.g. at 130° C. to 180° C. for a period of time sufficient to form a homogeneous mixture, normally 1 to 120 minutes depending on the type of mixing device.

Useful Applications

The blends of this invention can then be used as adhesives on substrates such as asphalt, cement, metals, Mylar.™ (a biaxially-oriented polyethylene terephthalate), polymers (including polyolefins such as rubbers, plastics, thermoplastics), glass, ceramics, wood, paper, rocks, minerals and paint, cardboard, and the like. Preferred examples include polyethylene, polypropylene, and Mylar.™. Examples of further applications that can comprise the new resin and be improved thereby include but are not limited to: sealants, contact adhesives, PSAs, CAs, HMPSAs, packaging, laminates, coating materials, bookbindings, structural adhesives, upholstery adhesives, wood adhesives, automotive adhesives, cement adhesives, or asphalt adhesives (e.g. as an adhesive for affixing reflectors to asphalt) and the like.

The adhesives produced as described above are also applied as a coating or film onto paper, corrugated paper, polyolefins, polyolefin films, polyesters, polyester films, metals, glass, thermoplastics, plastics, elastomers, thermoplastic elastomers (TPE's), natural substances such as wood and pulp; fabric, melt blown or spun bonded plastics and the like. These adhesive compositions on a backing can then be applied to substrates which can be any of the above. The adhesives can then be used in tapes and labels, diapers, feminine products, book binders and non-wovens. Likewise the adhesives described above can be formulated into pressure sensitive adhesives, hot melt adhesives, hot melt pressure sensitive adhesive and the like.

The following examples demonstrate the invention and are not intended to limit it in any manner.

EXAMPLES

Examples 1–66 are shown in Tables 1–4. The same example numbers are used in different tables to identify each of the resins from polymerzation through characterization of the resins and performance testing of adhesive blends containing those same resins. Table 1 shows the methods of preparing cyclic copolymer tackifier resins. Table 2 shows the characterization of tackifier resins of Examples 1–41 and the performance of those resins in pressure sensitive adhesive blends. Table 3 shows the characterization of tackifier resins of Examples 42–44 and the performance of those resins in hot melt adhesive blends. Table 4 shows characterization data for tackifier resins of Examples 45–66.

Production of Tackifier Resins

Example 1

In Example 1, a 1-liter stainless steel Zipperclave™ polymerization reactor was purged with nitrogen and charged with 400 ml of hexane as a solvent; 0.273 mole of 5-ethylidene-2-norbornene as a cyclic comonomer; and 0.5 ml of a 25 weight percent solution of tri-isobutyl aluminum in toluene (TIBA) as an aluminum alkyl compound scavenger. As an alpha-olefin monomer, 0.62 moles of bulk propylene was added to the reactor and the contents were stirred until the reactor contents reached a reaction temperature of 80° C. Simultaneously, 0.079 mmole dimethyl bis (cyclopentadienyl) zirconium as a transition metal catalyst was pre-activated with an equimolar amount of an activator, dimethylanilinium tetrakis(pentafluorophenyl) boron (DMA-pfp) in 2 ml toluene. The activated catalyst was loaded in a stainless steel catalyst tube and charged into the reactor with a 50 ml rinse of the same type solvent as used in the reactor charge step using high-pressure nitrogen. The polymerization was allowed to proceed for a run time of 30 minutes at which time the reactor was vented and the polymerization quenched with a small amount of isopropanol. The product was isolated by filtering to remove any catalyst residues, concentrating the hexane solution on a rotary evaporator, and removing the unreacted cyclic comonomer under vacuum (0.2–5 torr, 150° C.–180° C., nitrogen sparge). Approximately 50 mg of a stabilizer, Irganox™ 1010 (tetrakis(methylene(3,5-di-tert-butyl-4-hydroxyhydrocinnamate), a stabilizer available from Ciba-Geigy Corp., Ardsley, N.Y.), was added to prevent degradation during the vacuum distillation step. The yield was 7.5 g.

Examples 2–25

Examples 2–25 were prepared using the same basic procedure as in Example 1 except that the types and amounts of components as well as process conditions were changed as shown in Table 1. Additionally, the reaction product made in Examples 17 and 65 were hydrogenated by dissolving the resin in octane and passing the solution over an activated nickel-tungsten catalyst in a lab scale reactor at a flow rate of 5 ml/h at 250° C. under 400 psig (2760 kPa) of hydrogen flowing at a rate of 25 scc/min. The catalyst (6% NiO, 22% $WO_3$) was supported on alumina and activated by sulfiding at 320° C. for 20 hours using a 1.1 weight percent folution of t-butyldisulfide in octane (space velocity of approximately 2). The product was isolated by heating to 80°–90° C. under vacuum (0.2 torr(28 Pa)) to remove the residual solvent. The hydrogenated structure was confirmed by the disappearance of the olefinic signals in the $^1$H NMR.

Examples 26–29

Dicylcopentadiene (DCPD, 95% purity, purchased from Aldrich Chemical Company) was purified through a column capable of removing the t-butylcatechol inhibitor. The DCPD and a quantity of 10% methylalumoxane (MAO) in toluene solution (purchased from Ethyl Corporation) were introduced through a septum inlet into a two liter Zipperclave™ reactor equipped with a paddle impeller, an external water jacket for temperature control, and regulated supply of dry nitrogen. The contents of the reactor were then stirred for 5 minutes. The transition metal compound was dissolved in toluene and introduced into the reactor under nitrogen pressure. Approximately 4.96 moles of liquid propylene was introduced to the reactor, which was then heated. The contents were stirred at 1000 rpm and allowed to run for 30 minutes. The polymerization was terminated by rapidly venting, and cooling the system to room temperature in less than 10 minutes. The catalyst was deactivated by exposure to air. The polymer product was recovered by evaporating the solvent under a stream of nitrogen and then rigorously drying the polymer under approximately 100 kPa vacuum at about 50° C. for over 18 hours.

Examples 30–44

Examples 30–44 were prepared using the same basic procedure as in Example 1 except that types and amounts of components as well as process conditions were changed as shown in Table 1.

TABLE 1

| Ex. # | Solvent Type | Volume Solvent (ml) | Cyclic Comonomer[a] | Cyclic Feed (mole) | Aluminum Alkyl Scavenger[b] | Aluminum Alkyl Volume (ml) | C3= Feed (mole) | Reaction Temp. (°C.) | Transition Metal Catalyst (TMC) | TMC Amount (mmol) | Activator (Volume) | Run Time (hrs.) | Yield (g) | Activity[c] |
|---|---|---|---|---|---|---|---|---|---|---|---|---|---|---|
| 1 | hexane | 400 | ENB | 0.273 | TIBA | 0.5 | 0.62 | 80 | Cp$_2$ZrMe$_2$ | 0.079 | DMA-pfp | 0.5 | 6.8 | 172 |
| 2 | hexane | 400 | ENB | 0.151 | TIBA | 0.5 | 0.62 | 80 | Cp$_2$ZrMe$_2$ | 0.079 | DMA-pfp | 0.5 | 7.1 | 180 |
| 3 | hexane | 400 | ENB | 0.242 | TIBA | 0.5 | 0.62 | 80 | Cp$_2$ZrMe$_2$ | 0.079 | DMA-pfp | 0.5 | 12 | 311 |
| 4 | hexane | 200 | ENB | 0.151 | TEAL | 0.2 | 0.31 | 80 | Cp$_2$ZrMe$_2$ | 0.079 | DMA-pfp | 0.5 | 5.3 | 134 |
| 5 | hexane | 200 | ENB | 0.151 | TEAL | 0.2 | 0.31 | 80 | Cp$_2$ZrMe$_2$ | 0.079 | DMA-pfp | 0.5 | 6.0 | 152 |
| 6 | toluene | 400 | ENB | 0.303 | TIBA | 0.5 | 0.62 | 80 | Cp$_2$ZrMe$_2$ | 0.079 | DMA-pfp | 0.5 | 7.9 | 200 |
| 7 | hexane | 400 | ENB | 0.16 | TIBA | 0.5 | 0.62 | 80 | Cp$_2$ZrMe$_2$ | 0.079 | DMA-pfp | 0.5 | 5.4 | 137 |
| 8 | hexane | 400 | ENB | 0.273 | TIBA | 0.5 | 0.62 | 80 | ZrSMe$_2$ | 0.048 | DMA-pfp | 0.5 | 3.0 | 125 |
| 9 | hexane | 400 | ENB | 0.303 | TIBA | 0.5 | 0.62 | 80 | ZrSMe$_2$ | 0.048 | DMA-pfp | 0.5 | 5.1 | 213 |
| 10 | hexane | 200 | DCPD | 0.151 | TEAL | 0.2 | 0.31 | 80 | Cp$_2$ZrMe$_2$ | 0.079 | DMA-pfp | 0.5 | 7.3 | 185 |
| 11 | hexane | 200 | DCPD | 0.151 | TIBA | 0.5 | 0.31 | 80 | Cp$_2$ZrMe$_2$ | 0.079 | DMA-pfp | 0.5 | 4.8 | 122 |
| 12 | hexane | 200 | DCPD | 0.151 | TEAL | 0.5 | 0.31 | 80 | Cp$_2$ZrMe$_2$ | 0.079 | DMA-pfp | 0.5 | 5.5 | 139 |
| 13 | hexane | 200 | DCPD | 0.151 | TEAL | 0.2 | 0.31 | 80 | Cp$_2$ZrMe$_2$ | 0.079 | DMA-pfp | 0.5 | 7.9 | 200 |
| 14 | hexane | 200 | DCPD | 0.151 | TEAL | 0.2 | 0.31 | 80 | Cp$_2$ZrMe$_2$ | 0.079 | DMA-pfp | 0.5 | 7.9 | 200 |
| 15 | hexane | 200 | DCPD | 0.151 | TEAL | 0.2 | 0.31 | 80 | Cp$_2$ZrMe$_2$ | 0.079 | DMA-pfp | 0.5 | 7.9 | 200 |
| 16 | hexane | 200 | DCPD | 0.151 | TIBA | 0.2 | 0.31 | 80 | Cp$_2$ZrMe$_2$ | 0.079 | DMA-pfp | 0.25 | 3.3 | 167 |
| 17 | hexane | 200 | DCPD | 0.151 | TIBA | 0.3 | 0.31 | 80 | Cp$_2$ZrMe$_2$ | 0.079 | DMA-pfp | 0.5 | 13 | 332 |
| 18 | hexane | 200 | DCPD | 0.151 | TIBA | 0.5 | 0.62 | 80 | Cp$_2$ZrMe$_2$ | 0.079 | DMA-pfp | 0.25 | 9.2 | 466 |
| 19 | hexane | 200 | DCPD | 0.151 | TEAL | 0.2 | 0.62 | 90 | ZrSMe$_2$ | 0.072 | DMA-pfp | 0.25 | 30 | 1,683 |
| 20 | hexane | 200 | DCPD | 0.151 | TIBA | 0.5 | 0.31 | 90 | ZrSMe$_2$ | 0.072 | DMA-pfp | 0.25 | 6.9 | 383 |
| 21 | hexane | 200 | DCPD | 0.151 | TIBA | 0.5 | 0.62 | 80 | ZrSMe$_2$ | 0.072 | DMA-pfp | 0.25 | 32 | 1,794 |
| 22 | hexane | 200 | DCPD | 0.151 | TEAL | 0.5 | 0.62 | 60 | ZrSMe$_2$ | 0.072 | DMA-pfp | 0.25 | 27 | 1,478 |
| 23 | hexane | 200 | DCPD | 0.151 | TIBA | 0.5 | 0.62 | 60 | ZrSMe$_2$ | 0.072 | DMA-pfp | 0.25 | 21 | 1,161 |
| 24 | hexane | 200 | DCPD | 0.151 | TIBA | 0.2 | 0.62 | 60 | ZrSMe$_2$ | 0.072 | DMA-pfp | 0.25 | 6.7 | 372 |
| 25 | hexane | 200 | DCPD | 0.151 | TEAL | 0.2 | 0.62 | 60 | ZrSMe$_2$ | 0.072 | DMA-pfp | 0.25 | 7.5 | 417 |
| 26 | none | na | DCPD | 0.075 | none | na | 4.96 | 60 | Me$_2$SiCp$_2$ZrCl$_2$ | 0.016 | MAO(3 cc) | 0.5 | 11 | 1,309 |
| 27 | none | na | DCPD | 0.075 | none | na | 4.96 | 60 | Cp$_2$ZrCl$_2$ | 0.016 | MAO(3 cc) | 0.5 | 11 | 1,375 |
| 28 | none | na | DCPD | 0.075 | none | na | 4.96 | 60 | Cp$_2$ZrCl$_2$ | 0.016 | MAO (10 cc) | 0.5 | 36 | 4,500 |
| 29 | none | na | DCPD | 0.075 | none | na | 4.96 | 60 | Me$_2$Si(Me-Cp)$_2$ArCl$_2$ | 0.016 | MAO (3 cc) | 0.5 | 24 | 3,000 |
| 30 | hexane | 200 | NB | 0.151 | none | na | 0.31 | 80 | Cp$_2$ZrMe$_2$ | 0.079 | DMA-pfp | 0.5 | 3.8 | 96 |
| 31 | hexane | 200 | NB | 0.151 | TIBA | 0.5 | 0.31 | 80 | Cp$_2$ZrMe$_2$ | 0.079 | DMA-pfp | 0.5 | 3.6 | 91 |
| 32 | hexane | 200 | NB | 0.151 | TIBA | 0.5 | 0.31 | 80 | Cp$_2$ZrMe$_2$ | 0.079 | DMA-pfp | 0.5 | 4.6 | 116 |
| 33 | hexane | 400 | NB | 0.301 | TIBA | 0.5 | 0.62 | 80 | Cp$_2$ZrMe$_2$ | 0.079 | DMA-pfp | 0.5 | 10.9 | 276 |
| 34 | hexane | 400 | NB | 0.212 | TIBA | 0.5 | 0.62 | 80 | Cp$_2$ZrMe$_2$ | 0.079 | DMA-pfp | 0.5 | 8.8 | 223 |
| 35 | hexane | 400 | NB | 0.241 | TIBA | 0.5 | 0.62 | 80 | Cp$_2$ZrMe$_2$ | 0.079 | DMA-pfp | 0.5 | 11.8 | 299 |
| 36 | hexane | 400 | NB | 0.149 | TIBA | 0.5 | 0.62 | 80 | Cp$_2$ZrMe$_2$ | 0.079 | DMA-pfp | 1.0 | 9.0 | 114 |
| 37 | hexane | 400 | NB | 0.191 | TIBA | 0.5 | 0.62 | 80 | Cp$_2$ZrMe$_2$ | 0.079 | DMA-pfp | 0.5 | 18 | 456 |
| 38 | hexane | 400 | NB | 0.149 | TIBA | 0.5 | 0.62 | 75 | Cp$_2$ZrMe$_2$ | 0.079 | DMA-pfp | 0.5 | 4.7 | 119 |
| 39 | hexane | 400 | NB | 0.138 | TIBA | 0.5 | 0.62 | 75 | Cp$_2$ZrMe$_2$ | 0.079 | DMA-pfp | 0.5 | 5.5 | 139 |
| 40 | hexane | 400 | NB | 0.138 | TIBA | 0.5 | 0.62 | 75 | Cp$_2$ZrMe$_2$ | 0.079 | DMA-pfp | 0.5 | 5.3 | 134 |
| 41 | hexane | 400 | NB | 0.301 | TIBA | 0.5 | 0.62 | 75 | Cp$_2$ZrMe$_2$ | 0.079 | DMA-pfp | 0.5 | 3.3 | 138 |
| 42 | hexane | 400 | DCPD | 0.756 | TIBA | 0.5 | 1.24 | 80 | Cp$_2$ZrMe$_2$ | 0.079 | DMA-pfp | 0.5 | 42 | 1063 |
| 43 | hexane | 400 | ENB | 0.242 | TIBA | 0.5 | 0.62 | 80 | ZrSMe$_2$ | 0.048 | DMA-pfp | 0.5 | 12 | 311 |
| 44 | hexane | 400 | NB | 0.301 | TIBA | 0.5 | 0.62 | 80 | Cp$_2$ZrMe$_2$ | 0.079 | DMA-pfp | 0.5 | 11 | 276 |
| 45 | None | NA | DCPD | 0.150 | None | NA | 9.91[d] | 80 | ZrSCl$_2$ | 0.079 | DMA-pfp | 0.5 | 31 | 12,320 |

TABLE 1-continued

| Ex. # | Solvent Type | Volume Solvent (ml) | Cyclic Comonomer[a] | Cyclic Feed (mole) | Aluminum Alkyl Scavenger[b] | Aluminum Alkyl Volume (ml) | C3= Feed (mole) | Reaction Temp. (°C.) | Transition Metal Catalyst (TMC) | TMC Amount (mmol) | Activator (Volume) | Run Time (hrs.) | Yield (g) | Activity[c] |
|---|---|---|---|---|---|---|---|---|---|---|---|---|---|---|
| 46 | None | NA | DCPD | 0.150 | None | NA | 9.91 | 80 | ZrSCl$_2$ | 0.079 | DMA-pfp | 0.5 | 30 | 11,840 |
| 47 | None | NA | DCPD[e] | 0.075 | None | NA | 4.96 | 80 | Z2Z | 0.016 | MAO(3 cc) | 1.25 | 45 | 2,225 |
| 48 | None | NA | DCPD | 0.075 | None | NA | 4.96 | 80 | Cp$_2$ZrCl | 0.016 | MAO(3 cc) | 1.25 | 5.4 | 675 |
| 49 | None | NA | DCPD | 0.075 | None | NA | 9.91 | 80 | Z2Z | 0.016 | MAO(6 cc) | 0.5 | 53.4 | 6675 |
| 50 | hexane | 200 | DCPD | 0.151 | TEAL | 0.2 | 0.62 | 60 | ZrSMe$_2$ | 0.072 | DMA-pfp | 0.25 | 20.7 | 1,150 |
| 51 | hexane | 200 | DCPD | 0.151 | TEAL | 0.2 | 1.24 | 80 | ZrSMe$_2$ | 0.036 | DMA-pfp | 0.25 | 3.3 | 367 |
| 52 | hexane | 200 | DCPD | 0.151 | TEAL | 0.2 | 0.62 | 80 | ZrSMe$_2$ | 0.036 | DMA-pfp | 0.25 | 2.8 | 311 |
| 53 | hexane | 200 | DCPD | 0.151 | TEAL | 0.2 | 0.62 | 80 | ZrSMe$_2$ | 0.072 | DMA-pfp | 0.25 | 12.7 | 706 |
| 54 | hexane | 200 | DCPD | 0.151 | TEAL | 0.2 | 0.62 | 60 | ZrSMe$_2$ | 0.072 | DMA-pfp | 0.25 | 30 | 1,667 |
| 55 | hexane | 200 | DCPD | 0.151 | TEAL | 0.4 | 0.62 | 90 | ZrSMe$_2$ | 0.072 | DMA-pfp | 0.25 | 14 | 778 |
| 56 | hexane | 200 | DCPD | 0.151 | TIBA | 0.3 | 0.62 | 60 | ZrSMe$_2$ | 0.072 | DMA-pfp | 0.25 | 15.1 | 839 |
| 57 | hexane | 200 | DCPD | 0.151 | TIBA | 0.6 | 0.62 | 60 | ZrSMe$_2$ | 0.072 | DMA-pfp | 0.25 | 16.3 | 906 |
| 58 | hexane | 200 | DCPD | 0.151 | TIBA | 0.5 | 0.62 | 60 | ZrSMe$_2$ | 0.072 | DMA-pfp | 0.25 | 15.5 | 861 |
| 59 | hexane | 200 | DCPD | 0.151 | TIBA | 0.5 | 0.62 | 60 | ZrSMe$_2$ | 0.072 | DMA-pfp | 0.25 | 16.0 | 889 |
| 60 | hexane | 200 | DCPD | 0.151 | TIBA | 0.5 | 0.31 | 80 | ZrSMe$_2$ | 0.072 | DMA-pfp | 0.25 | 8.7 | 483 |
| 61 | hexane | 200 | DCPD | 0.151 | TIBA | 0.5 | 0.31 | 80 | ZrSMe$_2$ | 0.072 | DMA-pfp | 0.25 | 7.7 | 428 |
| 62 | hexane | 200 | DCPD | 0.151 | TEAL | 0.2 | 0.62 | 90 | ZrSMe$_2$ | 0.072 | DMA-pfp | 0.25 | 15.4 | 856 |
| 63 | hexane | 200 | DCPD | 0.151 | TIBA | 0.3 | 0.31 | 80 | CP$_2$ZrMe$_2$. | 0.079 | DMA-pfp | 0.50 | 13.1 | 663 |
| 64 | hexane | 200 | DCPD | 0.151 | TIBA | 0.3 | 0.31 | 80 | CP$_2$ZrMe$_2$. | 0.079 | DMA-pfp | 0.50 | 9.0 | 456 |
| 65 | hexane | 200 | DCPD[f] | 0.151 | TIBA | 0.3 | 0.31 | 80 | CP$_2$ZrMe$_2$. | 0.079 | DMA-pfp | 0.50 | 9.0 | 456 |
| 66 | hexane | 200 | NB | 0.148 | TIBA | 0.5 | 0.31 | 90 | ZrSMe$_2$ | 0.072 | DMA-pfp | 0.25 | 1.4 | 78 |

Me = methyl, Cp = cyclopentadienyl, Ind = indenyl.
ZrSMe$_2$ = dimethyl[dimethylsilanyl bis(tetrahydroindenyl)]zirconium
ZrSCl$_2$ = Dimethylsilanyl-bis (tetrahydroindenyl)zirconium dichloride
Z2Z = cyclopentadienyl (t-butoxy)zirconium dichloride
[a]ENB = 5-ethylidene-2-norbornene, neat; DCPD = dicyclopentadien, 60–80 weight percent solution in hexane in Examples 10–25 & 42, and neat (95% purity available from Aldrich Chemical Company) in Examples 26–29; NB = norbornene, in 50–70 weight percent solution in hexane in Examples 30–31 & 44
[b]TIBA = tri-isobutyl aluminum, 25 weight percent solution in toluene; TEAL = tri-ethyl aluminum, 25 weight percent solution in heptane
[c]Activity = (grams resin product)/(mmol TMC * hours)
[d]10 psi hydrogen
[e]0.02 mole NB
[f]hydrogenated Tackifier Resin Characterization and Adhesive Blend Performance Tests and Standards Differential Scanning Calorimetry (DSC, ASTM E-1356, at a heating rate of 5° C./minute) was used to measure $T_g$.

Gel Permeation Chromotography (GPC) was used to measure $M_n$, $M_w$, and Z-average molecular weight ($M_z$). GPC data was obtained on a Waters 150° C. equipped with 2 Shodex mixed bed columns (KF80MS) and 2 Phenomenex (500Å and 100Å) columns in THF at a flow rate of 1 ml/min and at 45° C. All other GPC data were obtained on a Waters 590/712 WISP equipped with Polymer Labs Mixed D, $10^4$Å, 500Å, and 50Å columns in THF. Both instruments were equipped with RI detectors and GPC values reported are polystyrene equivalent molecular weights.

Softening point of some of the tackifier resins was measured by the Ring and Ball method (ASTM E-28).

Performance of the adhesive blends were measured by: Ball Tack (ASTM D-3121; PSTC-6 [PSTC=Pressure Sensitive Tape Council]); 180° Peel (PSTC-1); Shear Adhesion Failure Temperature (SAFT)(ASTM D-4498); Loop Tack (described below); holding power (PSTC-7); Saybolt color (ASTM D-156-94); Gardner color (ASTM D-1544); Blend Cloud Point (explained in detail below); T-peel (described in discussion of adhesive examples 42–44 below); set time (explained in detail below); and blend viscosity (explained in detail below).

Loop tack involves contacting an adhesive tape surface to a solid substrate and measuring the force required to separate the adhesive tape and the solid substrate using the following technique. Test specimens are cut from standard films to 1"×9" (2.54 cm×22.9 cm) dimensions. A loop is made out of test strip with the adhesive side out and the ends are attached using masking tape. Tests are run at standard conditions of 23° C.±2° C. and 50% humidity. Stainless steel substrate panels (2"×5"×1/16" (5.08 cm×6.45 cm×0.16 cm)) are used and each test is prepared individually and tested immediately (within one minute). An Instron is prepared for the testing by attaching a 90° Quick Stick jig to the lower jaw of the Instron. A clean stainless steel panel is placed in the test jig. The ends of a test loop are attached in the top jaw of the Instron and the loop is lowered onto the test panel at the rate of 2"/min (5.08 cm/min) until approximately 5"(12.7 cm) of test specimen is in contact with the panel. The adhesive tape contacts the stainless steel substrate with no pressure other than the weight of the tape itself. The test specimen is then pulled at the rate of 2"/min. Average loop values are reported in lbs/inch for a minimum of three determinations.

Set time is defined as the minimum amount of time required for a bond to be formed between a hot reek adhesive and a paper substrate. A large piece of corrugated paper board was lined with one inch square sections. Strips of 1 inch by 4 inch kraft paper were adhered to the empty space with a hot melt adhesive. One small drop of adhesive at 350° F.(177° C.) was placed on the corrugated board square then immediately a strip of kraft paper was placed on the drop and compressed with a 500 g weight for a timed period. The kraft strip was then pulled rapidly away to determine if a sufficiently strong bond is formed to tear the paper fiber. Then minimum time required is recorded as the set time. All of the EVA adhesives on the table exhibited less than one second set time which was considered to be sufficient performance to make the adhesive a probable-candidate for a cardboard box closure adhesive.

The wax cloud point of the HMA blend formulations described in Table 3 were obtained by heating the contents to 200° C. in a test tube with constant stirring using a thermometer. The test tube was then held at a 45° angle and cooled in air. The cloud point is defined as the temperature at which the first sign of persistent cloud or haze forms around the thermometer bulb. The procedure is repeated until two consecutive readings agree within 1°–2° C. The cloud point reported is an average and indicates the relative compatibility of the tackifier with the other components in the HMA formulation.

The melt viscosity of the HMA blend formulations described in Table 3 were determined using a Brookfield Digital Viscometer (Model RVTA) according to ASTM D-3236.

Proton Nuclear Magnetic Resonance ($^1$H NMR) data was obtained on a Varian 500 MHz spectrometer using the following conditions: pulse angle 30°, pulse delay 5 seconds, acquisition 3 seconds, spectral width 10,000 Hz, transients greater than or equal to 48. Mole percent comonomer incorporation was determined by comparing peak areas for the following chemical shift assignments (relative to TMS) versus the total integral for all protons in the spectrum:

| Comonomer | proton(s) | chemical shift, ppm |
| --- | --- | --- |
| DCPD | olefinic | 5.52, 5.64 |
| ENB | olefinic | 5.22, 5.05. |
| NB | bridgehead | 1.8–2.3 |

Examples 1–25

The tackifier resins produced as shown in Table 1 blended with a block copolymer of styrene-isoprene-styrene availabe from DEXCO Polymers under the trade name VECTOR 4111™ (a styrene-isoprene-styrene (SIS) block copolymer produced by Dexco Polymers having a weight average molecular weight of greater than 100,000; for more information on DEXCO copolymers see the Adhesive Age, June 1994 article by Jean Tancrede which is fully incorporated herein by reference for purposes of U.S. patent practice) into the following PSA Formulation:

| Component | Parts by Weight |
| --- | --- |
| Vector.™ 4111 | 100 |
| Tackifier resin | 100 |
| Flexon.™ 766 | 20 |
| IRGANOX.™ 1010 | 1 |
| Total PSA | 221 |

The tackifier and the block copolymer were solution blended using toluene (40 wt. % solids). The resulting blends were cast onto 1.5 mil (38.1 mm) Mylar.™ film (available from Dupont de Nemours, E. E. & Company) and the solvent evaporated to give a 1.5 mil (38.1 mm) dry layer of the formulated adhesive. Flexon.™ 766 is a naphthenic oil available from Exxon Chemical Company.

Examples 26–29

The tackifier resins produced as shown in Table 1 were combined with VECTOR.™ 4111. 100 phr of SIS block copolymer and 100 phr of the tackifier produced in Examples 26–29 above were solution blended then tested for adhesive properties. The data are reported in Table 2.

Examples 30–41

Tackifier resins produced as shown in Table 1, Examples 30–41 were blended into adhesive compositions by the same method used in Examples 1–25.

TABLE 2

| Example No. | Tackifier Resin |||||||||| Adhesive ||||
|---|---|---|---|---|---|---|---|---|---|---|---|---|---|---|
| | Comonomer | Mole Fraction comonomer | Weight Fraction comonomer | Tg °C. | $M_n$ | $M_w$ | $M_w/M_n$ | $M_z$ | Saybolt Color | 180° Peel, lb/in. (N/25.4 mm) | Loop Tack, lb/in. (N/25.4 mm) | Rolling Ball Tack, cm | SAFT °F.(°C.) |
| 1 | ENB | 0.69 | 0.86 | 52 | 498 | 1,067 | 2.14 | 1,848 | 8.5 | 6.1 (23) | 5.2 (23) | 13.4 | 195 (91) |
| 2 | ENB | 0.65 | 0.84 | 41 | 524 | 915 | 1.75 | 1,500 | 24.4 | 4.5 (20) | 3.4 (15) | 2.5 | 194 (90) |
| 3 | ENB | 0.59 | 0.80 | 41 | 559 | 1,028 | 1.84 | 1,743 | 22.4 | 4.8 (21) | 3.7 (16.4) | 4.6 | 190 (88) |
| 4 | ENB | 0.79 | 0.91 | 56 | 570 | 1,070 | 1.88 | 1,759 | nd | 3.8 (17) | 5.6 (25) | 23 | 198 (92) |
| 5 | ENB | 0.77 | 0.91 | 62 | 581 | 1,114 | 1.92 | 1,863 | nd | 4.0 | 13.5 (15.6) | >30 | 201 (94) |
| 6 | ENB | 0.61 | 0.82 | 54 | 782 | 1,487 | 1.90 | 2,511 | 11.5 | 6.4 (28) | 14.9 (22) | 12.5 | 203 (95) |
| 7 | ENB | 0.48 | 0.73 | 41 | 914 | 1,587 | 1.74 | 2,631 | 21 | 5.0 | 4.6 (20) | 3.4 | 210 (99) |
| 8 | ENB | 0.47 | 0.72 | 35 | 968 | 1,918 | 1.98 | 3,206 | nd | 4.6 (20) | 3.5 (16) | 6.9 | 208 (98) |
| 9 | ENB | 0.52 | 0.76 | 37 | 1,000 | 1,940 | 1.94 | 3,213 | nd | 4.9 (22) | 3.9 (17) | 7.5 | 206 (97) |
| 10 | DCPD | 0.41 | 0.69 | 60 | 456 | 971 | 2.13 | 2,966 | nd | 3.0 | 1 (4.4) | >20 | 190 (88) |
| 11 | DCPD | 0.42 | 0.69 | 61 | 499 | 1,038 | 2.08 | 2,823 | nd | 2.2 | 1.38 (6.2) | >20 | 194 (90) |
| 12 | DCPD | 0.5 | 0.76 | 53 | 505 | 1,116 | 2.21 | 3,523 | nd | 1.9 | 1.22 (5.4) | 26 | 197 (92) |
| 13 | DCPD | 0.42 | 0.69 | 66 | 514 | 1,108 | 2.16 | 3,121 | nd | 1.7 | 0.9 (4.0) | >25 | 192 (89) |
| 14 | DCPD | 0.42 | 0.69 | 66 | 514 | 1,108 | 2.16 | 3,121 | nd | 1.8 | 0.95 (4.2) | 21 | 196 (91) |
| 15 | DCPD | 0.41 | 0.69 | 58 | 514 | 1,108 | 2.16 | 3,121 | 14.9 | 2.1 (9.3) | 0.7 (3.1) | 3.75 | 207 (97) |
| 16 | DCPD | 0.39 | 0.67 | 37 | 541 | 1,201 | 2.22 | 3,827 | 18.7 | 1.8 (8.1) | 0.75 (3.3) | >30 | 197 (92) |
| 17 | DCPD | 0.33 | 0.61 | 42 | 585 | 1,352 | 2.31 | 4,088 | nd | 0.36 (1.6) | 0.15 (6.7) | 20 | 188 (87) |
| 18 | DCPD | 0.26 | 0.52 | 4 | 627 | 1,317 | 2.10 | 3,262 | nd | 1.5 (6.7) | 0 | >30 | 189 (87) |
| 19 | DCPD | 0.26 | 0.65 | 52 | 688 | 1,402 | 2.04 | 2,530 | nd | 0.20 (0.89) | 0 | >30 | 128 (53) |
| 20 | DCPD | 0.37 | 0.65 | 14 | 844 | 1,529 | 1.81 | 2,505 | nd | 0.7 (3.1) | 0.05 (0.22) | >30 | 182 (83) |
| 21 | DCPD | 0.26 | 0.52 | 22 | 899 | 1,864 | 2.07 | 3,416 | nd | 0.65 (2.9) | 0 | >30 | 158 (70) |
| 22 | DCPD | 0.29 | 0.56 | 22 | 971 | 1,975 | 2.03 | 3,833 | nd | 0.63 (2.8) | 0 | >30 | 161 (72) |
| 23 | DCPD | 0.31 | 0.59 | 38 | 1,055 | 2,107 | 2.00 | 3,877 | nd | 0.22 (1.0) | 0.03 (0.13) | >30 | 169 (76) |
| 24 | DCPD | 0.34 | 0.62 | 55 | 1,058 | 2,065 | 1.95 | 3,465 | nd | 0.05 (0.22) | nd | 23 | 183 (84) |
| 25 | DCPD | 0.32 | 0.60 | 55 | 1,446 | 3,130 | 2.16 | 5,516 | nd | 0.08 (0.36) | nd | 22 | 178 (81) |
| 26 | DCPD | 0.22 | 0.47 | nd | 470 | 703 | 1.50 | 1,238 | nd | 1.25 (5.5) | 0.61 (2.7) | nd | 174 (79) |
| 27 | DCPD | 0.2 | 0.44 | nd | 520 | 912 | 1.75 | 1,838 | nd | 0.7 (3.1) | 0.52 (2.3) | nd | 192 (89) |
| 28 | DCPD | 0.08 | 0.21 | nd | 620 | 1,183 | 1.91 | 3,095 | nd | 0.02 (0.09) | 0.04 (0.18) | nd | nd |
| 29 | DCPD | 0.14 | 0.34 | nd | 840 | 1,709 | 2.03 | 3,618 | nd | 0.22 (1.0) | 0.25 (1.1) | nd | nd |
| 30 | NB | 0.69 | 0.83 | 43 | 376 | 702 | 1.87 | 1,131 | nd | 1.6 (7.1) | 1.7 (7.8) | >30 | 195 (91) |
| 31 | NB | 0.56 | 0.74 | 48 | 381 | 726 | 1.91 | 1,159 | 25.0 | 2.5 (11.1) | 0.65 (2.9) | 30 | 198 (92) |
| 32 | NB | 0.56 | 0.74 | 46 | 392 | 721 | 1.84 | 1,118 | 25.2 | 1.5 (6.7) | 0.98 (4.4) | >30 | 199 (93) |
| 33 | NB | 0.71 | 0.85 | 55 | 419 | 712 | 1.70 | 1,098 | nd | 2.4 (10.7) | 0.5 (2.2) | >30 | 200 (93) |
| 34 | NB | 0.61 | 0.78 | 36 | 442 | 733 | 1.66 | 1,072 | nd | 1.57 (7.0) | 0.55 (2.4) | 30 | 195 (91) |
| 35 | NB | 0.64 | 0.80 | 41 | 470 | 765 | 1.63 | 1,118 | nd | 0.82 (3.6) | 0.35 (1.55) | >30 | 205 (96) |
| 36 | NB | 0.59 | 0.76 | 24 | 487 | 887 | 1.82 | 2,798 | nd | 0.75 (3.3) | 0 | >30 | 157 (69) |
| 37 | NB | 0.66 | 0.81 | 30 | 502 | 864 | 1.72 | 1,621 | nd | 0.18 (0.8) | 0 | >30 | 206 (97) |
| 38 | NB | nd | nd | 38 | 529 | 802 | 1.52 | 1,125 | nd | 0.65 (2.9) | 0 | >30 | 200 (93) |
| 39 | NB | 0.58 | 0.76 | 31 | 534 | 876 | 1.64 | 1,553 | nd | 0.32 (1.42) | 0 | >30 | 198 (92) |

TABLE 2-continued

| | | | Tackifier Resin | | | | | | | | Adhesive | | | |
|---|---|---|---|---|---|---|---|---|---|---|---|---|---|---|
| | | | | | | | | | | | | Loop Tack, | | |
| Example No. | Comonomer | Mole Fraction comonomer | Weight Fraction comonomer | Tg °C. | $M_n$ | $M_w$ | $M_w/M_n$ | $M_z$ | Saybolt Color | 180° Peel, lb./in. (N/25.4 mm) | lb./in. (N/25.4 mm) | Rolling Ball Tack, cm | SAFT °F(°C.) |
| 40 | NB | 0.57 | 0.75 | 32 | 542 | 829 | 1.53 | 1,174 | nd | 0.12 (0.53) | 0 | >30 | 198 (92) |
| 41 | NB | 0.43 | 0.63 | 34 | 754 | 1,597 | 2.12 | 2,709 | nd | 0.05 (0.22) | 0 | >30 | 161 (72) | nd = no data
NA = not applicable

For the 9 examples that were measured for Saybolt color, color of the untreated resins ranged from 8.5 in Example 1 to 25.2 in Example 32. A Saybolt color of 15 equates to a Gardner color of approximately 3. The Saybolt values of 20 or more in Examples 2–5, 31, and 32 are better than a Gardner color of approximately 1.5. The Saybolt values of 25 or more in Examples 31 and 32 are considered exceed the typical validity limit of the Gardner color scale and are considered to meet the commercially desirable standard of "near water white".

Softening Points (Ring Ball) were measured on 4 examples. Softening Points for Examples 19, 21, 22, and 23 were respectively 4, 14, 22 and 38.

Examples 1–25 and 30–41 show adhesive compositions based on 100 parts of Vector 4111, 100 parts of a tackifier resin of this invention, 20 parts of Flexon 766, and 1 part Irganox.™ 010. A comparative adhesive example was formulated by omitting the tackifier and replacing it with the base polymer resulting in a blend of 200 parts of Vector.™ 4111, 20 parts of Flexon.™ 766, and 1 part Irganox.™ 1010, but high viscosity prevented acceptable application to the substrate.

Examples 26–30 show adhesive compositions based on 100 parts of Vector 4111 and 100 parts of the tackifier resin of this invention.

As shown in Table 2, Examples 1–41 all show measurable adhesive performance in one or more of the tested adhesive performance attributes of 180° Peel, Loop Tack, Rolling Ball Tack, and SAFT.

180° Peel improved to in the range of from 0.02 lb./in. (0.09 N/25.4 mm) in Example 28 to 6.4 lb./in. (28.5 N/25.4 mm) in Example 6. Loop Tack improved to in the range of from 0 lb. (0 N/25.4 mm) to 5.6 lb. (24.9 N/25.4 mm) in Example 4. Roiling Ball Tack remained at greater than 30 cm in some cases, but was reduced to as low as 2.5 cm in Example 2. SAFT was increased to a range of from 128° F. (53° C.) in Example 19 to 210° F. (99° C.) in Example 7.

Examples 42–44

In Examples 42–44 below, a series of hot melt adhesives (HMA) were prepared based on the following formulation:

| Component | Weight percent |
|---|---|
| Escorene ™ UL 7720 | 38.5 |
| Cyclic copolymer tackifier | 25 |
| Escorez ™ 1310LC | 18.7 |
| Paraflint ™ H-1 | 17.3 |
| Irganox. ™ 1076 | 0.5 |
| Total HMA | 100 |

Escorene™ UL 7720, also known as XW8.36.™ is an ethylene-vinyl acetate copolymer (EVA) comprising about 28 weight percent vinyl acetate and having a melt index of about 150 dg/min., and a density of about 0.934, and is available from Exxon Chemical Company, Houston, Tex. The composition of the cyclic copolymer tackifiers used in these HMA blends is shown in further detail in Table 3, Examples 42–44. Escorez.™ 1310LC is an aliphatic hydrocarbon resin having an $M_n$ of approximately 1450, an $M_w/M_n$ of approximately 2.1, and a DSC $T_g$ of about 45° C., and is available from Exxon Chemical Company, Houston, Tex. Paraflint™ H-1 (a synthetic paraffin Fischer-Tropsch wax available from Moore & Munger Marketing, Inc., Sheldon, Conn.) is a wax available from Unocal Corp., Los Angeles, Calif. Irganox.™ 1076 is an oxidation inhibitor and thermal stabilizer available from Ciba-Geigy Corp., Ardsley, N.Y. Formulations were prepared at a nominal temperature of 150° C. Once the components had melted in the quiescent state, a hand held stirrer was used to mix them. Stirring was continued for 10 mutes after visual inspection indicated that a homogeneous blend had been achieved.

Each of the HMA formulations was laid out to form a thin film suitable for bonding. The HMA was heated to 150° C. in an oven then laid out on release paper using an eight path applicator to achieve a film that had a nominal thickness of about 0.005" (0.127 mm). The HMA films were used to bond cast films of polyethylene (Escorene™ LD-117, cast film, 10 mils 0.254" 0.127 mm thick). Seals were made in a Carver hot press heated to 150° C., the adhesive being sandwiched between polypropylene film using a pressure of approximately 40–100 p.s.i. (276–690 kPa) for 10 seconds. The resulting bond was found to be fairly consistent for examples anywhere within the specified range. Molding plates of ⅟₃₂" (0.794 mm) aluminum were used to separate the polypropylene film from the platens of the press. After sealing, the bonds were quenched between water cooled platens at a temperature of approximately 25° C. using a pressure of approximately 100 p.s.i. (690 kPa). For the purposes of T-peel testing, 0.5" (12.7 mm) strips were cut from the bonded sandwich of polypropylene film and HMA. Test pieces were allowed to age for a minimum of 24 hours prior to evaluating the strength of the bond. T-peel testing was carded out at room temperature on an Instron 4505 testing frame with an extension rate of 2"/minute and a sampling rate of 2 points/second. In the case of adhesives exhibiting only slip/stick failure the T-peel strength was taken as the average of the peaks on the force/deformation plot. When samples showed evidence of smooth peel the T-peel strength was taken as the average of the regions of smooth peel. In cases where both smooth peel and slip/stick were exhibited by the same sample the average value of the smooth peel is reported. For each HMA formulation five bonds were tested and the results averaged. The shear adhesion failure temperature was determined against kraft paper or polypropylene using a 1"×1" square (25.4 mm×25.4 mm) and a loading of 500 g.

TABLE 3

| Example No. | Tackifier Resin | | | | | | | | Adhesive | | | | |
|---|---|---|---|---|---|---|---|---|---|---|---|---|---|
| | Comonomer | Mole Fraction comonomer | Weight Fraction comonomer | Tg °C. | $M_n$ | $M_w$ | $M_w/M_n$ | $M_z$ | Blend Cloud Point, °C. | T-peel to PE Blend lb./ in. (N/ 25.4 mm) | Set time (sec.) | SAFT, °F. (°C.) | Blend viscosity, cps @ 350° F. (Pa*s @ 177° C.) |
| 42 | DCPD | 0.38 | 0.66 | 71 | 654 | 1231 | 1.88 | 2035 | 173 | 0.2 (.9) | <1 | 176 (80) | 1865 (1.865) |
| 43 | ENB | 0.59 | 0.80 | 41 | 559 | 1028 | 1.84 | 1743 | 110 | 0.4 (1.8) | <1 | 174 (79) | 1173 (1.173) |

TABLE 3-continued

| | | Tackifier Resin | | | | | | | Blend Cloud Point, °C. | Adhesive T-peel to PE lb./ in. (N/ 25.4 mm) | Set time (sec.) | SAFT, °F. (°C.) | Blend viscosity, cps @ 350° F. (Pa*s @ 177° C.) |
|---|---|---|---|---|---|---|---|---|---|---|---|---|---|
| Example No. | Comonomer | Mole Fraction comonomer | Weight Fraction comonomer | Tg °C. | $M_n$ | $M_w$ | $M_w/M_n$ | $M_z$ | | | | | |
| 44 | NB | 0.71 | 0.85 | 55 | 419 | 712 | 1.7 | 1098 | 152 | 0.2 (0.9) | <1 | 168 (76) | 1145 (1.145) |
| A | NA | NA | NA | NA | NA | NA | NA | NA | 155 | 0.4 (1.8) | <1 | 165 (74) | 1625 (1.625) |

Examples 42–44 describe adhesive compositions based on 38.5 weight percent of Escorene.™ 7720, 25 weight percent of a tackifier resin of this invention, 18.7 weight percent of Escorez.™ 1310LC, 17.3 weight percent of Paraflint.™ H-1, and 0.5 weight percent of Irganox 1076. Comparative Example A was formulated by omitting the tackifier of this invention and replacing it with an equal weight percent of Escorez 1310LC. Examples 42–44 (blends of a tackifier of this invention and a conventional tackifier) exceed the performance of Comparative Example A in one or more of the tested performance areas while still performing favorably in the remaining areas. This shows that the new tackifier resins of this invention are a viable replacement for traditional tackifiers in HMA blends.

Table 4 shows characterization data for Examples 45–66.

TABLE 4

| Example No. | Comonomer | Mole Percent Comonomer | Weight Percent Comonomer | Tg (°C.) | Mw | Mn | Mw/Mn | Mz |
|---|---|---|---|---|---|---|---|---|
| 45 | DCPD | 6.7 | 18 | ND | 1492 | 602 | 2.48 | 3247 |
| 46 | DCPD | 5.3 | 15 | ND | 2757 | 1195 | 2.31 | 6132 |
| 47 | DCPD/NB | ND | ND | ND | 1139 | 504 | 2.26 | 3703 |
| 48 | DCPD | ND | ND | ND | 1149 | 535 | 2.15 | 3999 |
| 49 | DCPD | ND | ND | ND | 1090 | 553 | 1.97 | 3451 |
| 50 | DCPD | 30 | 57 | 44 | 3090 | 1840 | 1.68 | 4700 |
| 51 | DCPD | 27 | 54 | 46 | 4963 | 2760 | 1.80 | 7792 |
| 52 | DCPD | 34 | 62 | 57 | 4071 | 2426 | 1.68 | 6098 |
| 53 | DCPD | 31 | 59 | 57 | 4180 | 2330 | 1.79 | 6409 |
| 54 | DCPD | 24 | 50 | 12 | 2390 | 1410 | 1.70 | 3780 |
| 55 | DCPD | 32 | 60 | 53 | 4280 | 2400 | 1.78 | 6688 |
| 56 | DCPD | 35 | 63 | 55 | 4450 | 2490 | 1.79 | 6977 |
| 57 | DCPD | 34 | 62 | 57 | 4400 | 2465 | 1.78 | 6878 |
| 58 | DCPD | 31 | 59 | 55 | 3213 | 1500 | 2.14 | 5763 |
| 59 | DCPD | 31 | 59 | 52 | 3121 | 1471 | 2.12 | 5546 |
| 60 | DCPD | 36 | 64 | 67 | 1953 | 992 | 1.97 | 3322 |
| 61 | DCPD | 36 | 64 | 59 | 1978 | 1020 | 1.94 | 3367 |
| 62 | DCPD | 31 | 59 | 34 | 1690 | 909 | 1.86 | 2910 |
| 63 | DCPD | 39 | 67 | 66 | 1367 | 588 | 2.33 | 4278 |
| 64 | DCPD | 33 | 61 | 38 | 1172 | 487 | 2.41 | 3050 |
| 65 | DCPD* | 24 | 50 | 37 | 1153 | 587 | 1.96 | 2381 |
| 66 | ND | 41 | 61 | 20 | 1454 | 652 | 2.23 | 2366 |

*hydrogenated
ND = No data

All references described above, including testing procedures, are incorporated by reference in their entirety. As is apparent from the foregoing description, the materials prepared and the procedures followed relate to specific preferred embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

In the following claims which represent the invention in specific embodiments, each dependent embodiment for each of the below independent embodiments may be practiced with one or more of the limitations of the other dependent embodiments so as to represent other operable embodiments within the scope of the invention claimed.

What is claimed is:

1. A method for producing a tackifier resin, said method comprising copolymerizing at least one alpha-olefin and at least one cyclic olefin in the presence of a metallocene catalyst system under conditions suitable for the production of a copolymer having a $M_n$ of 5000 or below and a $T_g$ of 0° C. or above.

2. The method of claim 1 wherein the conditions are suitable for production of a copolymer having a $M_n$ in the range of from 200 to 2000.

3. The method of claim 1 wherein the conditions are suitable for production of a copolymer having a $T_g$ of greater than 30° C.

4. The method of claim 1 wherein the conditions are suitable for production of a copolymer containing about 20 to about 95 mole % of the cyclic olefin.

5. The method of claim 1 wherein the conditions are suitable for production of a copolymer having a $M_w/M_n$ of 3 or less.

6. The method of claim 1 wherein the metallocene catalyst system comprises a metallocene transition metal compound and an activator.

7. The method of claim 2 wherein the metallocene catalyst system comprises a cyclopentadienyl transition metal compound selected from the group consisting of:

dimethylsilanyl bis(methylcyclopentadienyl)zirconium dichloride;

dimethylsilanyl bis(cyclopentadienyl)zirconium dichloride;

bis(methylcyclopentadienyl)zirconium dichloride;

bis(cyclopentadienyl)zirconium dichloride;

dimethylsilanyl bis(tetrahydroindenyl)zirconium dichloride;

rac-dimethylsilyl-bis(tetrahydroindenyl)zirconium dimethyl;

dimethylsilanyl bis(methylcyclopentadienyl)zirconium dimethyl;

dimethylsilanyl bis(cyclopentadienyl)zirconium dimethyl;

bis(methylcyclopentadienyl)zirconium dimethyl;

bis(cyclopentadienyl)zirconium dimethyl;

dimethylsilanyl[(tetramethylcyclopentadienyl)(dodecylamino)]titanium dichloride; and cyclopentadienyl (t-butoxy)zirconium dichloride.

8. The method of claim 1 wherein the metallocene catalyst system comprises an activator of methylalumoxane or dimethylanilinium tetrakis(pentafluorophenyl) boron.

9. The method of claim 1 wherein the alpha-olefin contains from 3 to 8 carbon atoms.

10. The method of claim 1 wherein the cyclic olefin is selected from the olefins represented by the following formulae:

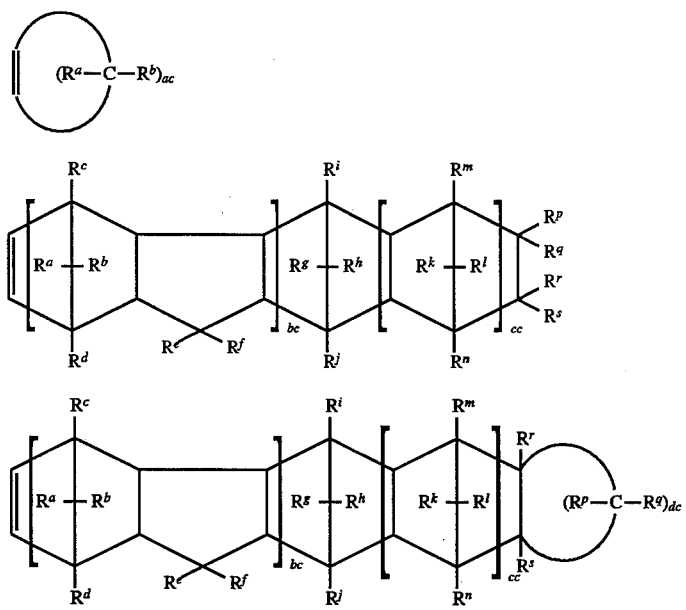

wherein each $R^a$ through $R^s$ is independently hydrogen, halogen, hydrocarbyl, or halohydrocarbyl; ac and dc are integers of 2 or more, and bc and cc are integers of 0 or more.

11. The method of claim 1 wherein the cyclic olefin is a trimer or a dimer of a cyclic olefin.

12. The method of claim 1 wherein the alpha-olefin is propylene and the cyclic olefin is dicyclopentadiene, 5-ethylidene-2-norbornene, or norbornene.

13. The method of claim 1 further comprising the step of hydrogenating the tackifier resin.

14. A tackifier resin consisting essentially of at least one alpha-olefin and from about 20 to about 95 mole % of at least one cyclic olefin, said alpha-olefin and cyclic olefin copolymerized in the presence of a metallocene catalyst system under conditions suitable for the production of a copolymer having a $T_g$ of 0° C. or more and a $M_n$ of 5000 or less.

15. The tackifier resin of claim 14 wherein the tackifier produced has an $M_n$ in the range of from 200 to 2000.

16. The tackifier resin of claim 14 wherein the tackifier produced has a $T_g$ of greater than 30° C.

17. The tackifier resin of claim 14 wherein the tackifier produced has a $T_g$ of 35° C. or more.

18. The tackifier resin of claim 14 wherein the tackifier resin produced has a $M_w/M_n$ of 3 or less.

19. The tackifier resin of claim 14 wherein the alpha-olefin contains from 3 to 8 carbon atoms.

20. The tackifier resin of claim 14 wherein the cyclic olefin is selected from the olefins represented by the following formulae:

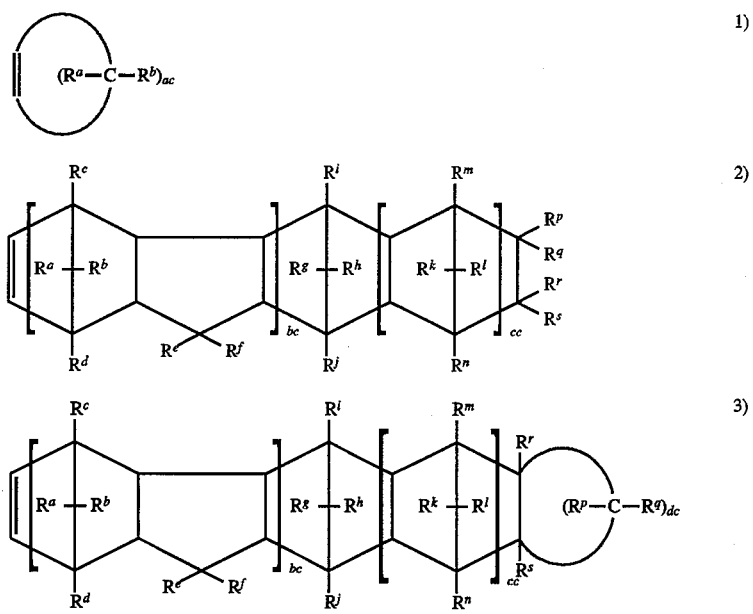

wherein each $R^a$ through $R^s$ is independently hydrogen, halogen, hydrocarbyl, or halohydrocarbyl; ac and dc are integers of 2 or more, and bc and cc are integers of 0 or more.

21. The tackifier resin of claim 14 wherein the cyclic olefin is a trimer or a dimer of a cyclic olefin.

22. The tackifier resin of claim 14 wherein the alpha-olefin is propylene and the cyclic olefin is dicyclopentadiene, 5-ethylidene-2-norbornene, or norbornene.

23. The tackifier resin of claim 14, said tackifier resin having been hydrogenated.

24. The tackifier resin of claim 14 further having a Saybolt color of 15 or more.

25. An adhesive comprising a base polymer and a tackifier resin said tackifier resin consisting essentially of at least one alpha-olefin and from about 20 to about 95 mole % of at least one cyclic olefin, said alpha-olefin and cyclic olefin copolymerized in the presence of a metallocene catalyst system under conditions suitable for the production of a copolymer having a $T_g$ of 0° C. or more and a $M_n$ of 5000 or less.

26. The adhesive of claim 25, wherein the base polymer is selected from the group consisting of: polyethylene, ethylene alpha-olefin copolymers, polypropylene, ethylene-vinyl acetate, polyvinyl chloride, natural rubber, nitrile rubber, polychloroprene rubber, polyisoprene, polyisobutylene and its copolymers, ethylene-propylene rubber, ethylene-propylene-diene termonomer rubber, butyl rubber, polystyrene, polybutadiene and styrenic block copolymers.

27. The adhesive of claim 25 wherein the alpha-olefin contains from 3 to 8 carbon atoms and the cyclic olefin is selected from the olefins represented by the following formulae:

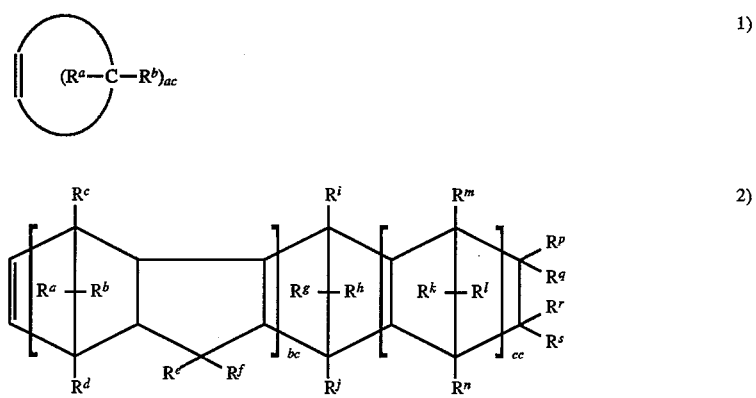

-continued

3)

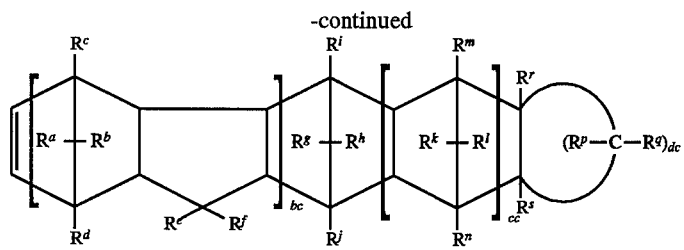

wherein each $R^a$ through $R^s$ is independently hydrogen, halogen, hydrocarbyl, or halohydrocarbyl; ac and dc are integers of 2 or more, and bc and cc are integers of 0 or more.

28. The adhesive of claim 25 further comprising additive, said additive comprising at least one member selected from the group consisting of an oil, a plasticizer, a wax, and a stabilizer.

29. The adhesive of claim 25 wherein the alpha-olefin is propylene and the cyclic olefin is dicyclopentadiene, norbornene, or 5-ethylidene-2-norbornene.

30. An article of manufacture comprising the adhesive of claim 25.

* * * * *